United States Patent [19]
McGaffigan

[11] Patent Number: 6,031,958
[45] Date of Patent: Feb. 29, 2000

[54] OPTICAL LIGHT PIPES WITH LASER LIGHT APPEARANCE

[76] Inventor: Thomas H. McGaffigan, 19089 Brookhaven Dr., Saratoga, Calif. 95070

[21] Appl. No.: 09/197,014

[22] Filed: Nov. 20, 1998

Related U.S. Application Data

[63] Continuation-in-part of application No. PCT/US98/09897, May 19, 1998.
[60] Provisional application No. 60/047,283, May 21, 1997.

[51] Int. Cl.[7] .................................................. G02B 6/00
[52] U.S. Cl. ........................ 385/146; 362/555; 362/559; 385/901
[58] Field of Search .................................. 362/555, 558, 362/559, 560; 385/47, 48, 36, 37, 146, 901

[56] References Cited

U.S. PATENT DOCUMENTS

| | | | |
|---|---|---|---|
| 2,424,064 | 7/1947 | Stegeman | 240/2.18 |
| 2,614,203 | 10/1952 | Dalton, Jr. et al. | 240/1.2 |
| 3,535,018 | 10/1970 | Vasilatos | 350/96 |
| 3,752,146 | 8/1973 | Kline | 128/2 A |
| 3,767,910 | 10/1973 | Harrigan | 240/10 B |
| 3,981,023 | 9/1976 | King et al. | 257/98 |
| 4,128,332 | 12/1978 | Rowe | 355/67 |
| 4,188,708 | 2/1980 | Frederiksen | 438/25 |
| 4,195,907 | 4/1980 | Zamja et al. | 350/96 |
| 4,244,683 | 1/1981 | Rowland | 425/143 |
| 4,260,220 | 4/1981 | Whitehead | 350/96.28 |
| 4,286,838 | 9/1981 | Huignard et al. | 372/50 |
| 4,323,951 | 4/1982 | Pasco | 362/27 |
| 4,422,719 | 12/1983 | Orcutt | 350/96.3 |
| 4,433,898 | 2/1984 | Nasiri | 385/91 |
| 4,466,697 | 8/1984 | Dariel | 350/96.3 |
| 4,467,193 | 8/1984 | Carroll | 250/216 |
| 4,517,628 | 5/1985 | McDermott | 362/186 |
| 4,542,449 | 9/1985 | Whitehead | 362/330 |
| 4,544,843 | 10/1985 | Kern et al. | 250/239 |
| 4,576,850 | 3/1986 | Martens | 428/156 |
| 4,588,258 | 5/1986 | Hoopman | 350/103 |
| 4,588,259 | 5/1986 | Sheiman | 350/132 |
| 4,609,976 | 9/1986 | Geissler | 362/202 |
| 4,615,579 | 10/1986 | Whitehead | 350/96.1 |
| 4,637,686 | 1/1987 | Iwamoto et al. | 385/128 |
| 4,642,736 | 2/1987 | Masuzawa et al. | 362/31 |
| 4,662,728 | 5/1987 | Whitehead | 206/414 |
| 4,671,630 | 6/1987 | Takahashi | 350/574 |
| 4,677,533 | 6/1987 | McDermott et al. | 362/240 |
| 4,684,919 | 8/1987 | Hihi | 362/244 |
| 4,703,219 | 10/1987 | Mesquida | 313/111 |
| 4,733,335 | 3/1988 | Serizawa et al. | 362/503 |
| 4,750,798 | 6/1988 | Whitehead | 350/96.1 |
| 4,753,520 | 6/1988 | Silverglate | 359/365 |
| 4,767,172 | 8/1988 | Nichols et al. | 385/146 |
| 4,787,708 | 11/1988 | Whitehead | 350/96.28 |
| 4,789,921 | 12/1988 | Aho | 362/348 |
| 4,791,540 | 12/1988 | Dreyer, Jr. et al. | 362/331 |
| 4,805,984 | 2/1989 | Cobb, Jr. | 350/96.28 |
| 4,834,495 | 5/1989 | Whitehead et al. | 350/96.28 |
| 4,850,665 | 7/1989 | Whitehead | 350/96.1 |
| 4,869,580 | 9/1989 | Silverglate | 261/88 |
| 4,906,070 | 3/1990 | Cobb, Jr. | 350/286 |

(List continued on next page.)

FOREIGN PATENT DOCUMENTS 59-49504  3/1984  Japan ........................... G02B 5/14

*Primary Examiner*—Hung N. Ngo
*Attorney, Agent, or Firm*—Burns, Doane, Swecker & Mathis, L.L.P.

[57] ABSTRACT

A simulated laser light system includes a light source which emits substantially parallel light rays and a prismatic element having a plurality of prismatic surfaces. The prismatic surfaces define a curved surface either on the inside or the outside of the prismatic element. The prismatic surfaces redirect the light rays emitted from the prismatic element in a plurality of planes which are perpendicular to a tangent to said curved surface. The simulated laser light system appears to emit light from a centerline of the prismatic element when the light is actually emitted from an exterior surface of the prismatic element.

32 Claims, 27 Drawing Sheets

6,031,958
Page 2

U.S. PATENT DOCUMENTS

| | | | |
|---|---|---|---|
| 4,929,866 | 5/1990 | Murata et al. | 313/500 |
| 4,935,665 | 6/1990 | Murata | 313/500 |
| 4,937,716 | 6/1990 | Whitehead | 362/268 |
| 4,947,291 | 8/1990 | McDermott | 362/19 |
| 4,952,023 | 8/1990 | Bradshaw et al. | 350/102 |
| 4,963,798 | 10/1990 | McDermott | 315/312 |
| 4,984,141 | 1/1991 | Lai et al. | 362/187 |
| 4,984,144 | 1/1991 | Cobb, Jr. et al. | 362/339 |
| 4,989,125 | 1/1991 | Cobb, Jr. et al. | 362/346 |
| 5,016,143 | 5/1991 | Aikens | 362/32 |
| 5,040,883 | 8/1991 | Cobb, Jr. | 359/742 |
| 5,043,850 | 8/1991 | Dreyer, Jr. | 362/26 |
| 5,054,885 | 10/1991 | Melby | 359/618 |
| 5,056,892 | 10/1991 | Cobb, Jr. | 359/831 |
| 5,095,415 | 3/1992 | Anderson et al. | 362/329 |
| 5,101,325 | 3/1992 | Davenport et al. | 362/31 |
| 5,117,478 | 5/1992 | Cobb, Jr. et al. | 385/133 |
| 5,130,531 | 7/1992 | Ito et al. | 250/216 |
| 5,161,879 | 11/1992 | McDermott | 362/206 |
| 5,174,649 | 12/1992 | Alston | 362/244 |
| 5,186,530 | 2/1993 | Whitehead | 362/31 |
| 5,190,370 | 3/1993 | Miller et al. | 362/340 |
| 5,224,770 | 7/1993 | Simmons et al. | 362/29 |
| 5,224,773 | 7/1993 | Arimura | 362/227 |
| 5,233,204 | 8/1993 | Fletcher et al. | 257/13 |
| 5,243,506 | 9/1993 | Whitehead | 362/307 |
| 5,257,173 | 10/1993 | Ohmamyuda et al. | 362/235 |
| 5,289,082 | 2/1994 | Komoto | 313/500 |
| 5,339,179 | 8/1994 | Rudisill et al. | 359/49 |
| 5,339,382 | 8/1994 | Whitehead | 385/146 |
| 5,345,531 | 9/1994 | Keplinger et al. | 385/102 |
| 5,363,470 | 11/1994 | Wortman | 385/147 |
| 5,412,548 | 5/1995 | Yee | 362/202 |
| 5,416,875 | 5/1995 | Keplinger et al. | 385/102 |
| 5,475,241 | 12/1995 | Harrah et al. | 257/99 |
| 5,475,785 | 12/1995 | Johanson | 385/100 |
| 5,479,322 | 12/1995 | Kacheria | 362/581 |
| 5,481,637 | 1/1996 | Whitehead | 385/125 |
| 5,519,596 | 5/1996 | Woolverton | 362/252 |
| 5,534,718 | 7/1996 | Chang | 257/88 |
| 5,578,156 | 11/1996 | Kamakura et al. | 156/275.5 |
| 5,579,429 | 11/1996 | Naum | 385/143 |
| 5,592,578 | 1/1997 | Ruh | 385/31 |
| 5,660,461 | 8/1997 | Ignatius et al. | 362/241 |
| 5,661,828 | 8/1997 | Riser et al. | 385/31 |
| 5,661,839 | 8/1997 | Whitehead | 385/131 |
| 5,664,862 | 9/1997 | Redmond et al. | 362/31 |
| 5,671,306 | 9/1997 | York et al. | 385/36 |
| 5,708,749 | 1/1998 | Kacheria | 385/123 |
| 5,715,347 | 2/1998 | Whitehead | 385/133 |
| 5,742,120 | 4/1998 | Lin | 313/512 |
| 5,777,433 | 7/1998 | Lester et al. | 313/312 |
| 5,779,353 | 7/1998 | Kacheria | 362/293 |
| 5,785,404 | 7/1998 | Wiese | 362/555 |
| 5,810,463 | 9/1998 | Kawahara et al. | 362/31 |
| 5,897,076 | 3/1999 | Cross | 362/555 |

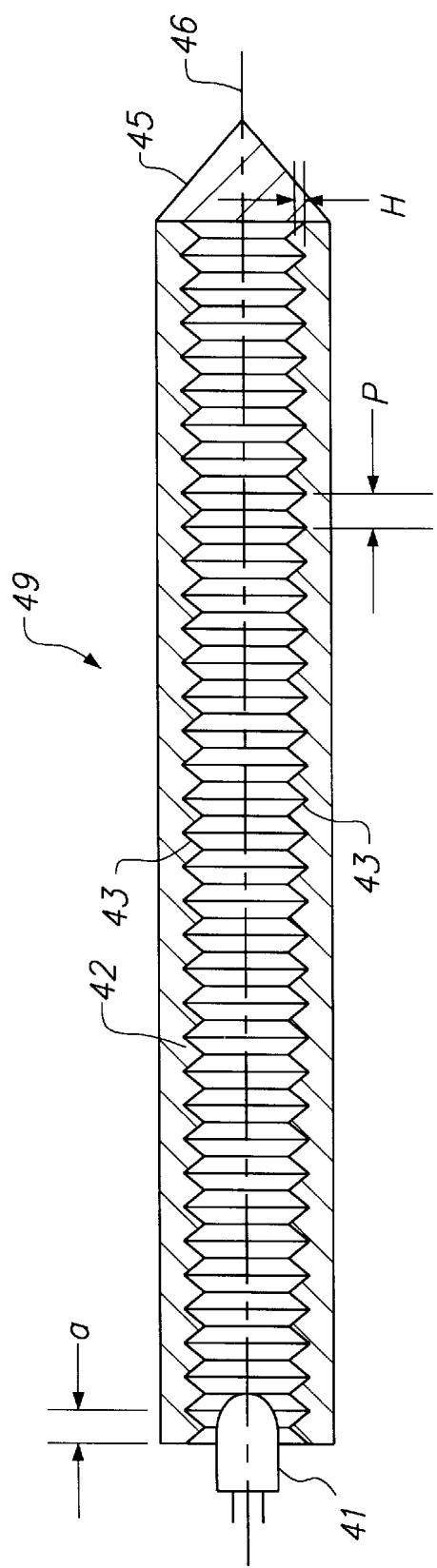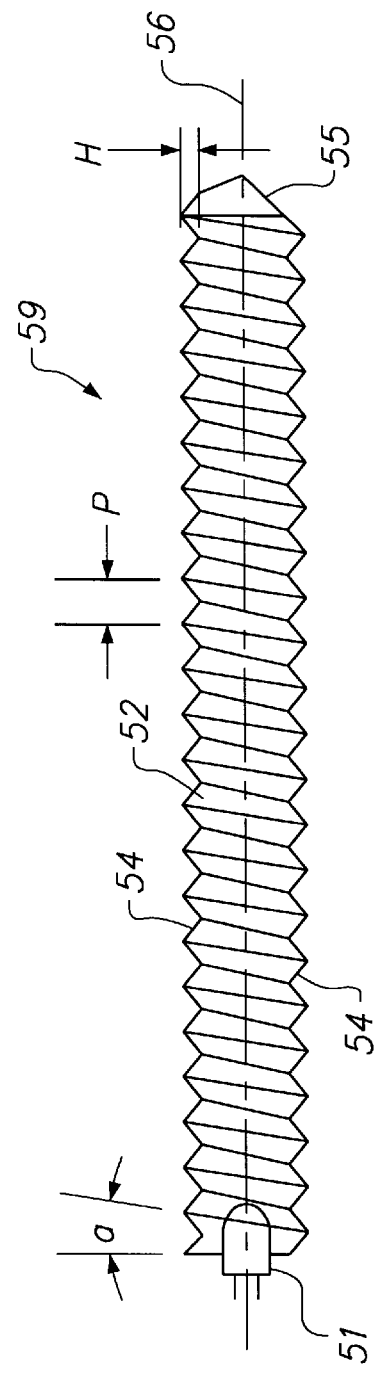
FIG. 4
FIG. 5

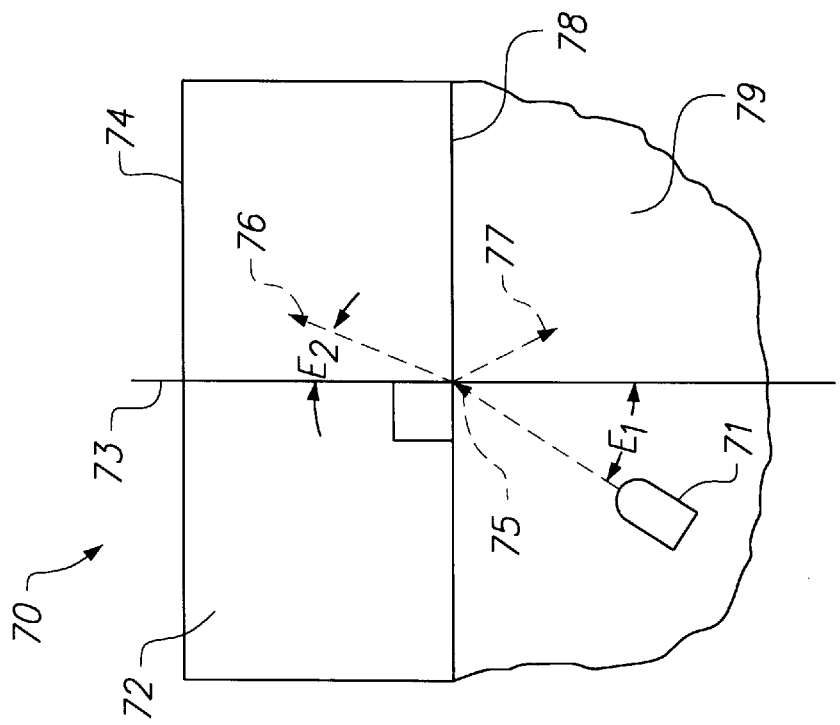
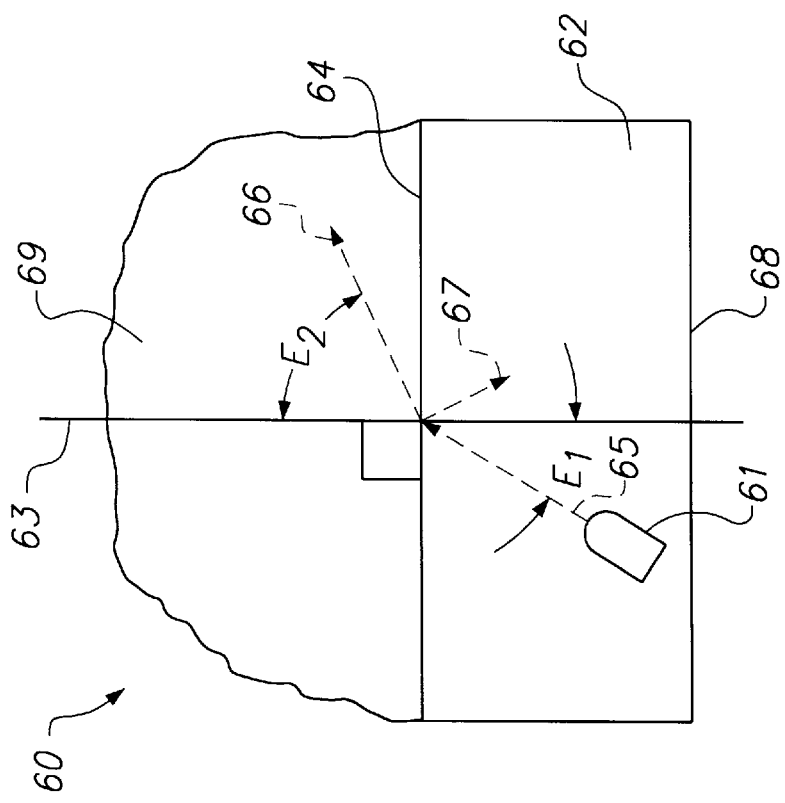

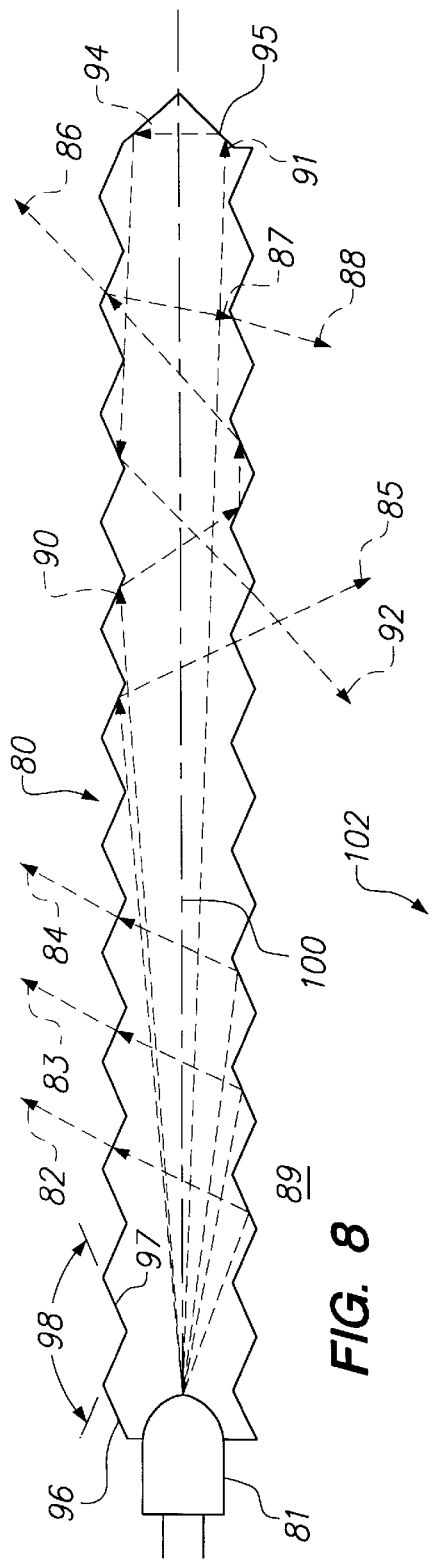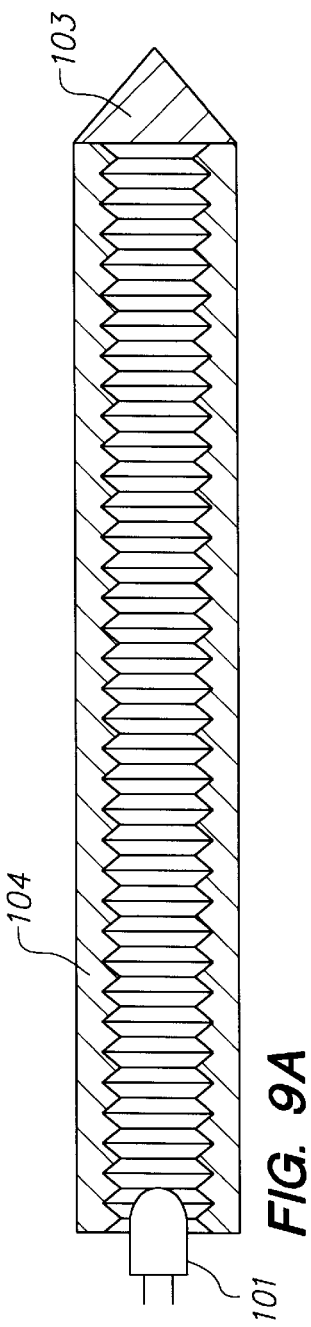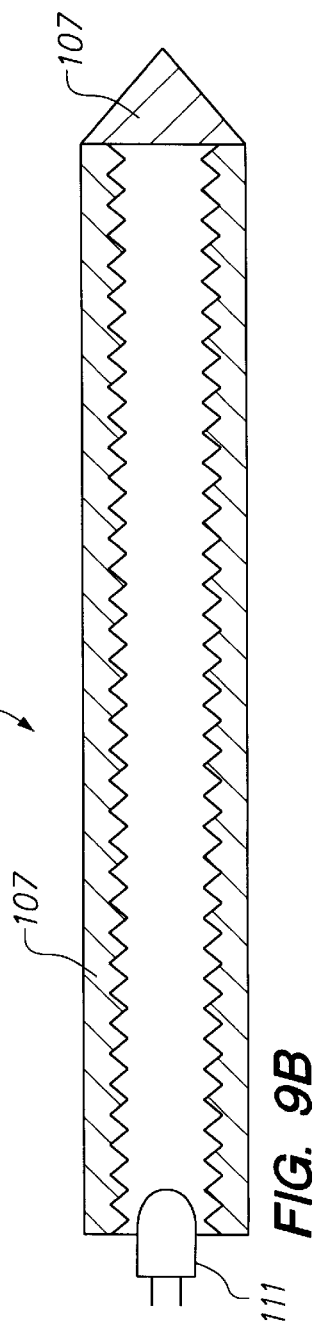
FIG. 8
FIG. 9A
FIG. 9B

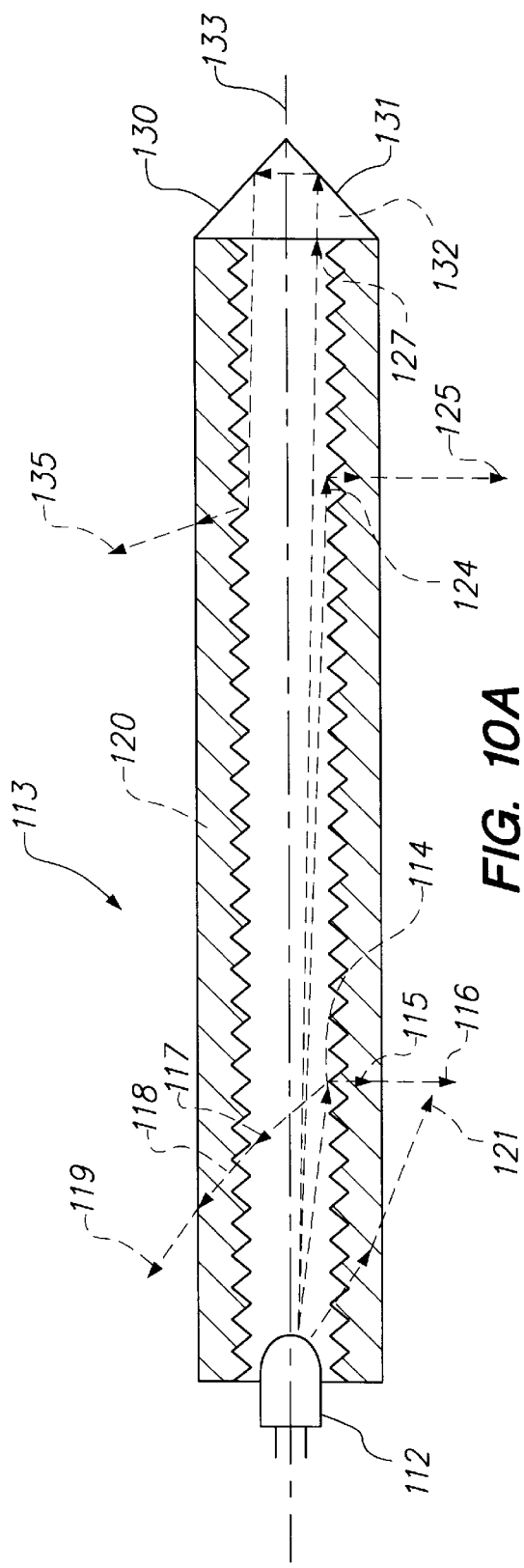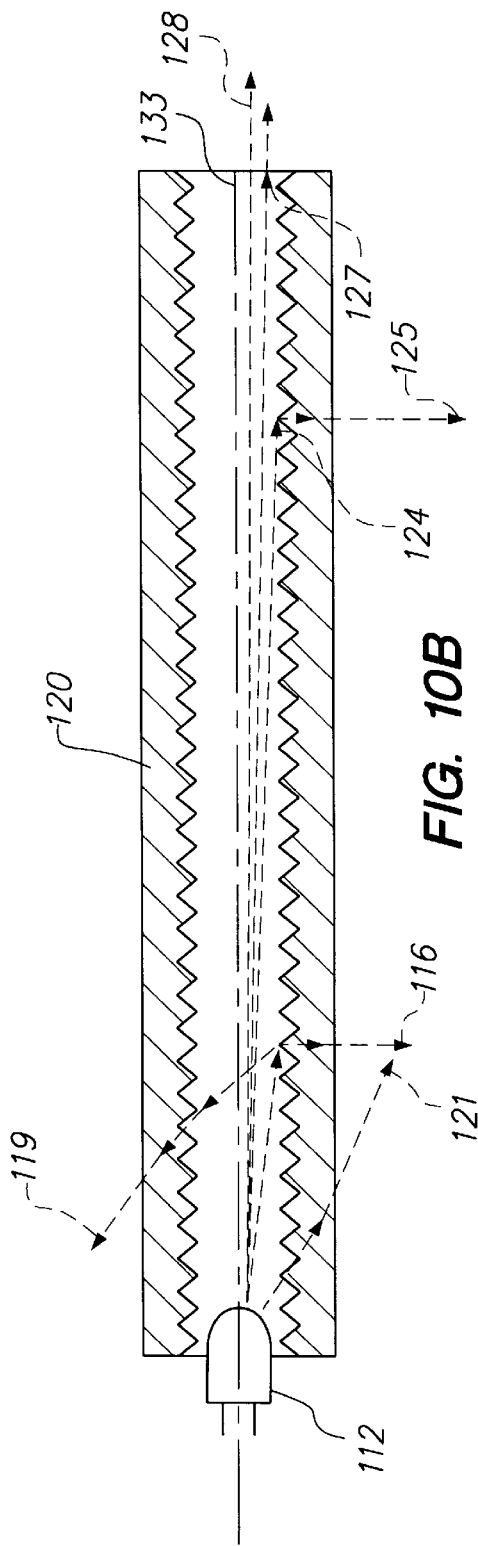

ANGULAR DISPLACEMENT – DEGREES

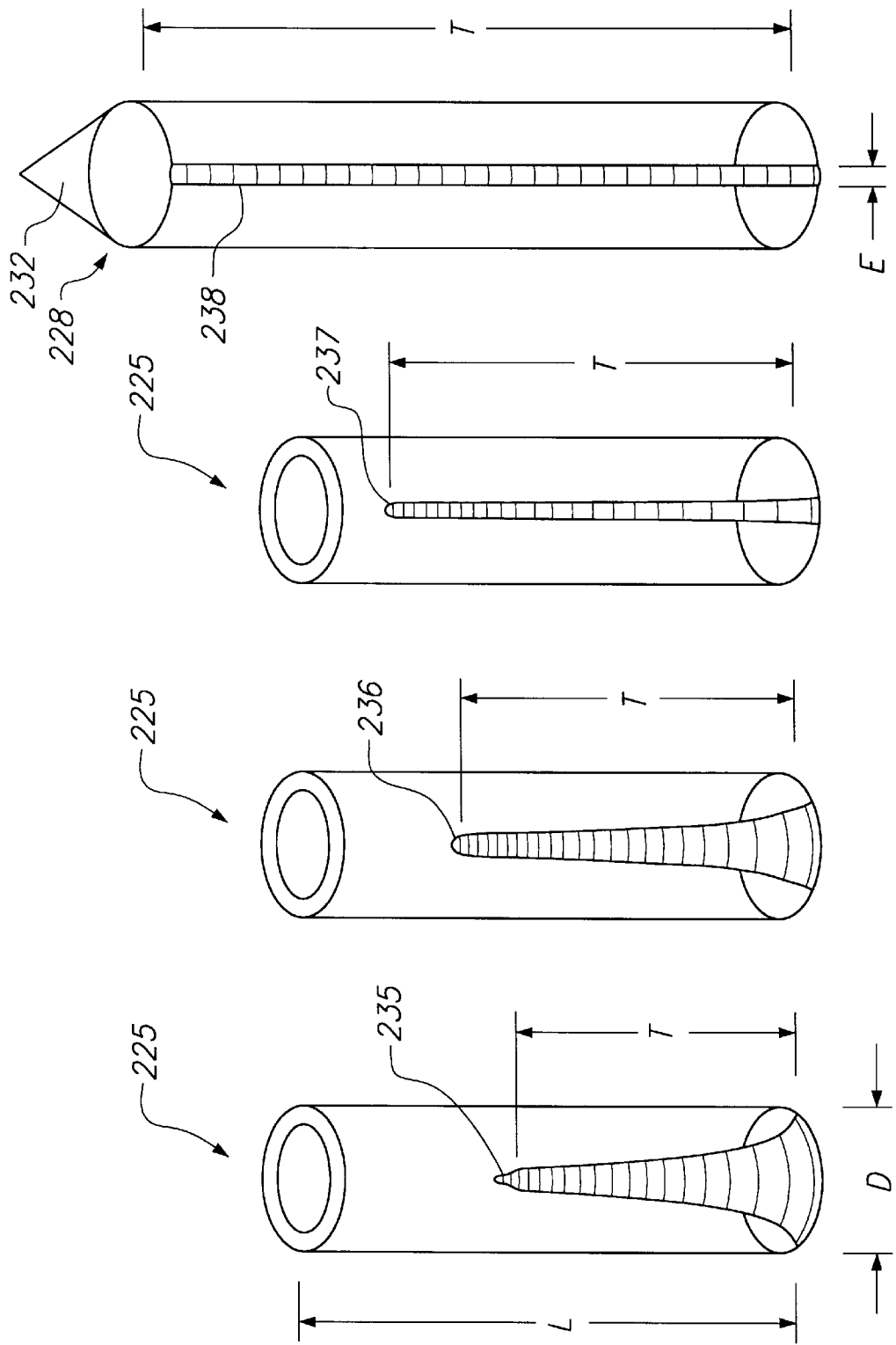

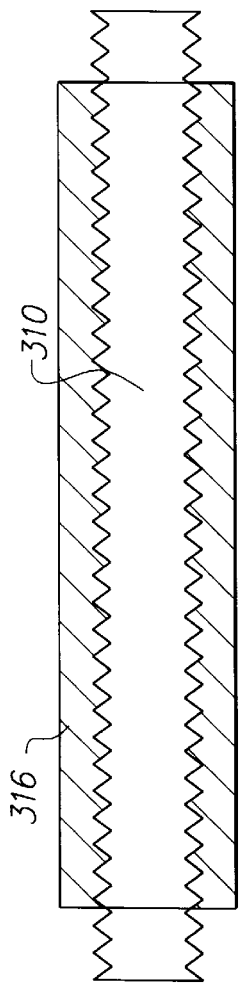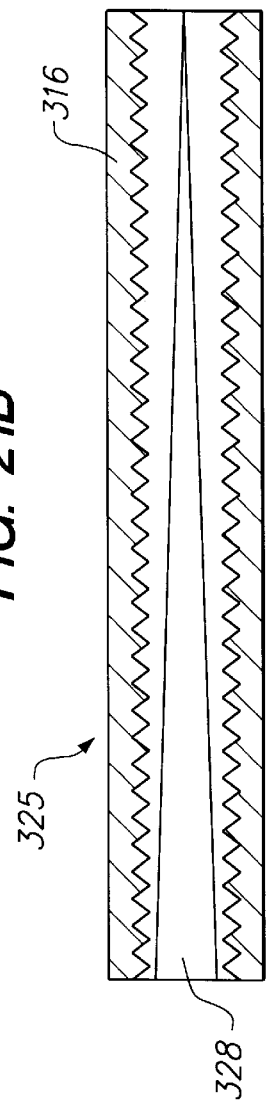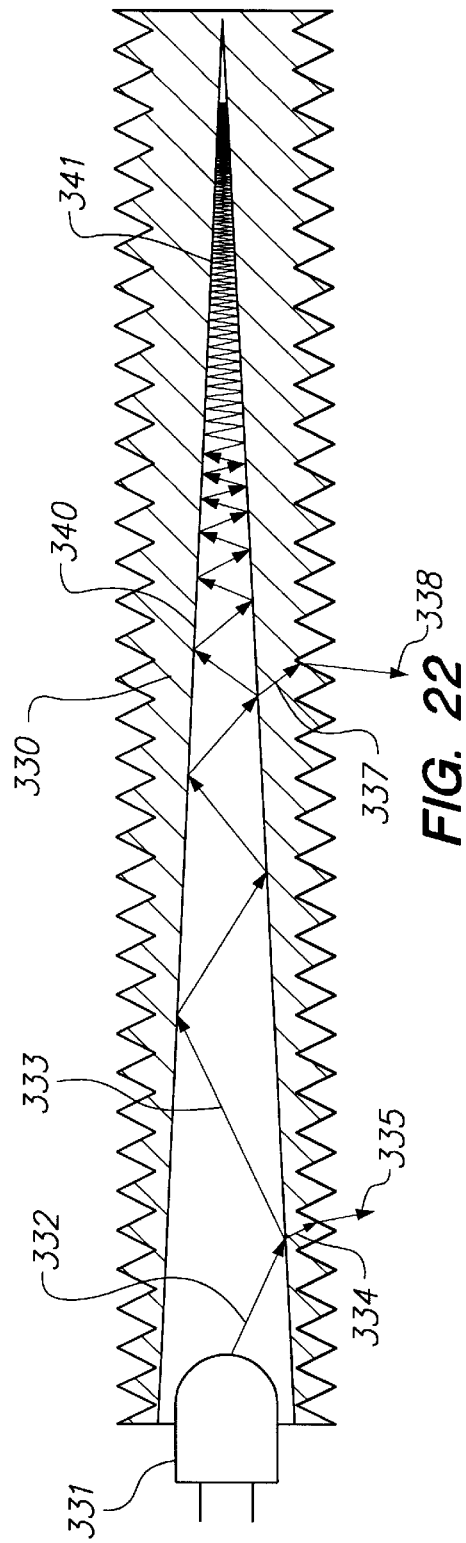

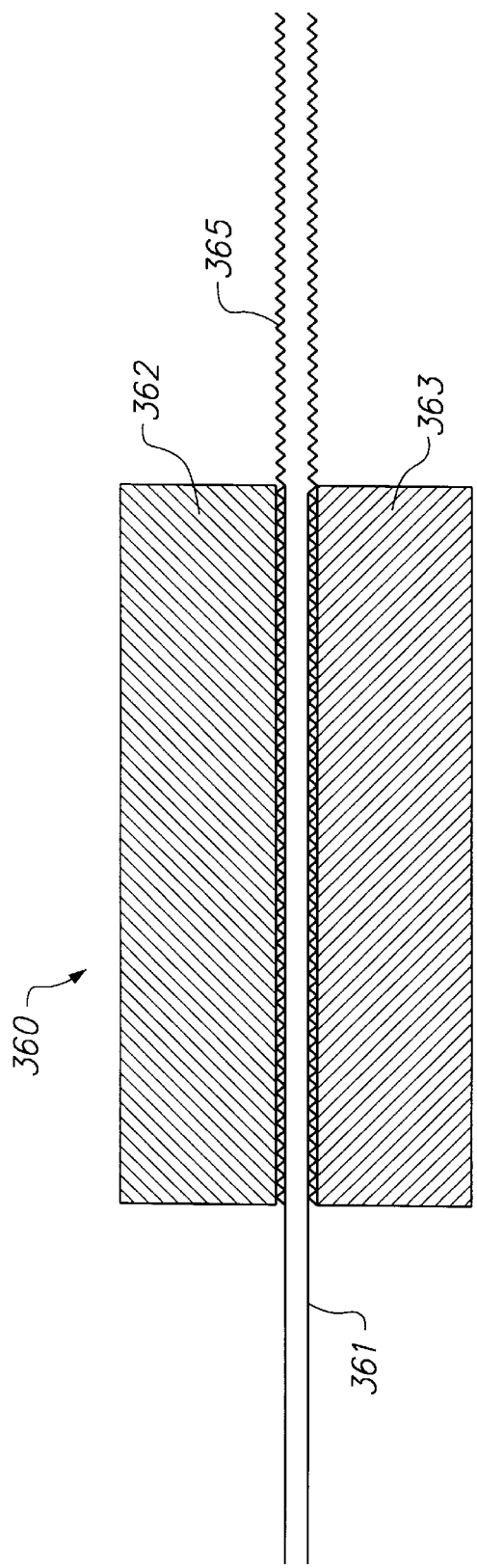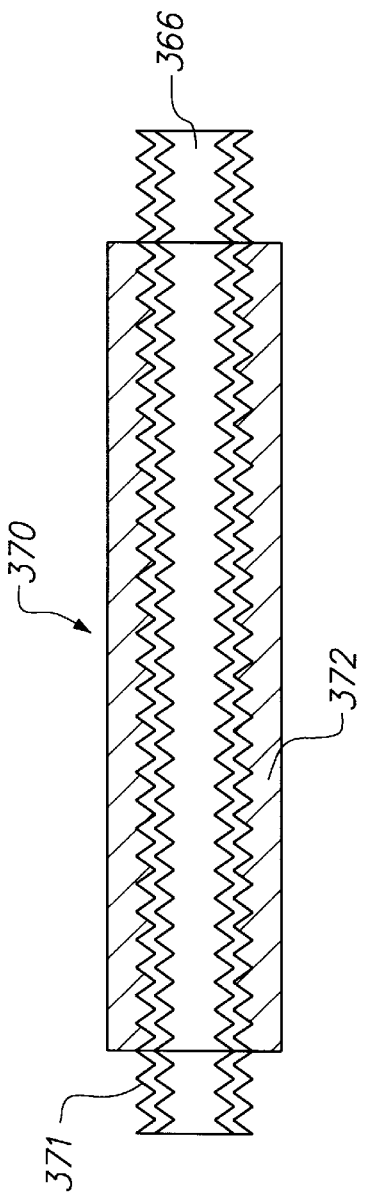
FIG. 24A
FIG. 24B

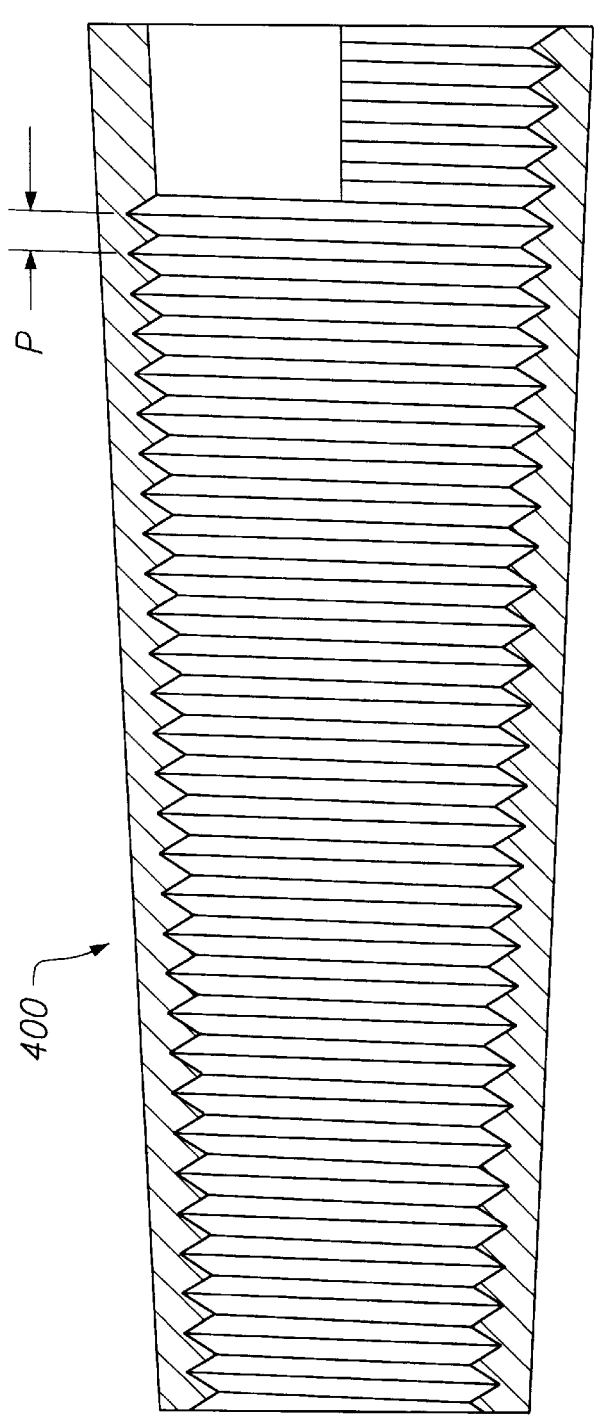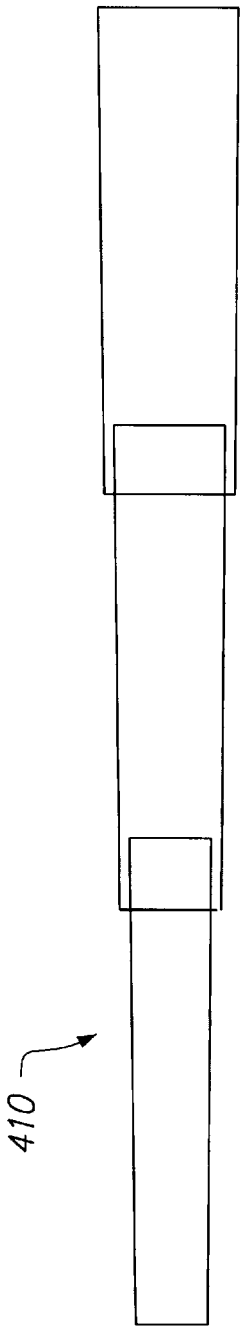
FIG. 27A
FIG. 27B

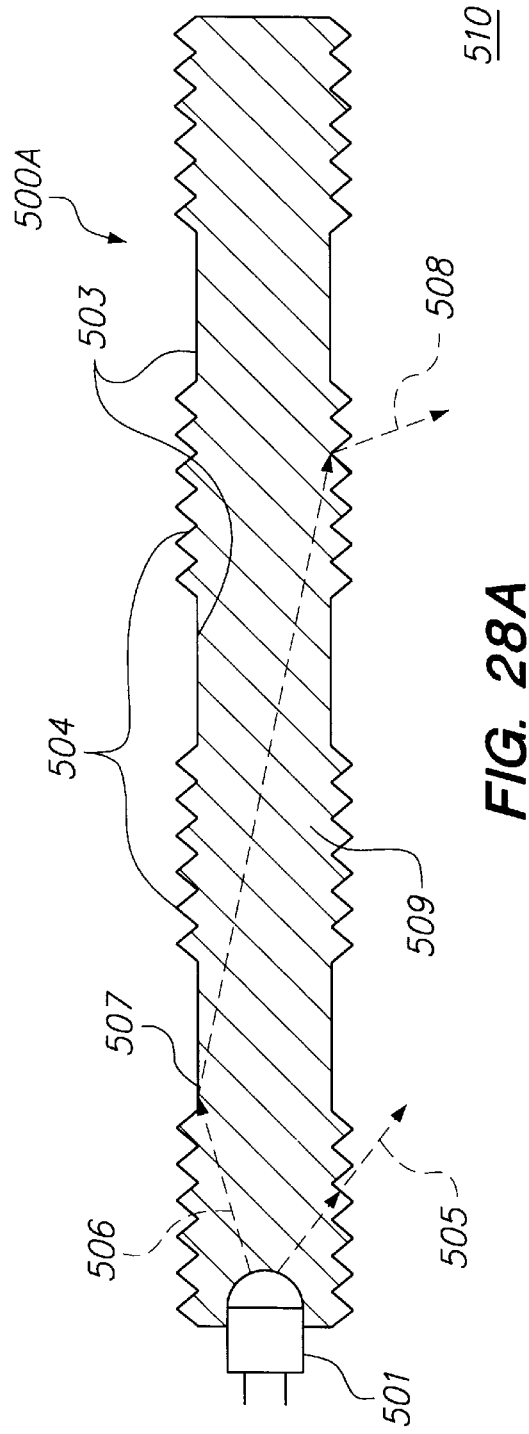
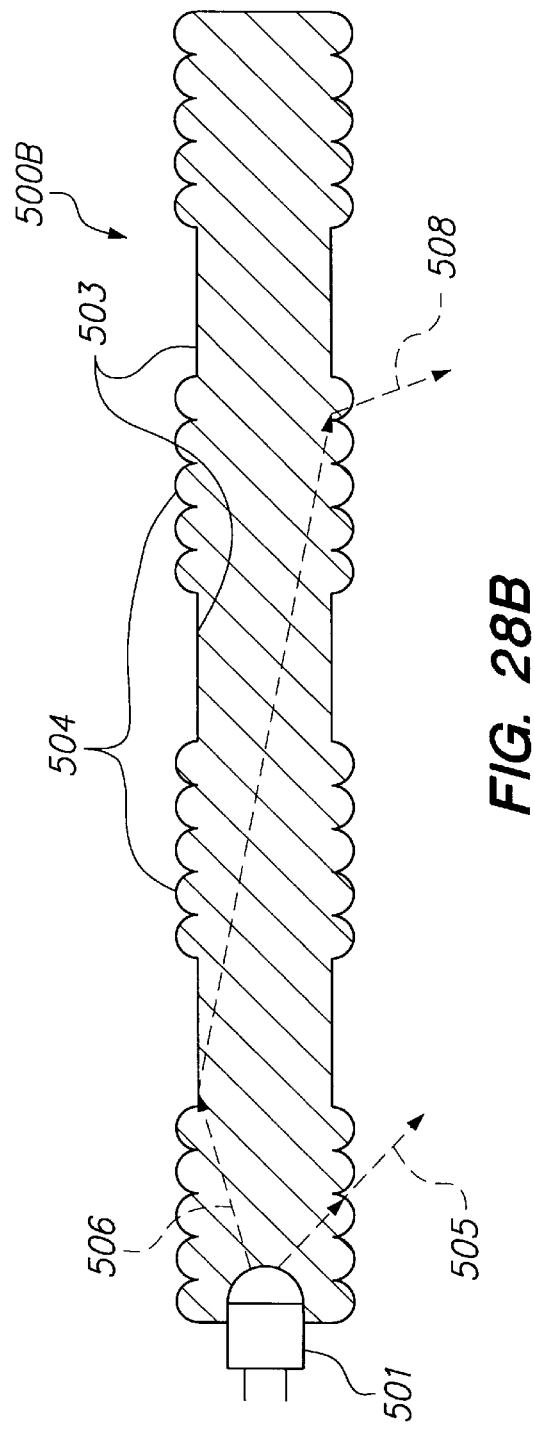
FIG. 28A
FIG. 28B

OPTICAL LIGHT PIPES WITH LASER LIGHT APPEARANCE

This application is a continuation in part of and claims priority under 35 U.S.C. §§ 119 and/or 365 to PCT US98/09897 filed May 19, 1998, which claims priority of U.S. Provisional Patent Application No. 60/047,283 filed May 21, 1997, both of which are incorporated herein by reference.

FIELD OF THE INVENTION

The field of the invention relates to optical light pipes and more specifically to optical light pipes that give the appearance of a laser beam being emitted axially within the light pipe. These light pipes also provide highly efficient radial and axial distribution of light.

BACKGROUND OF THE INVENTION

There have been several different types of optical light pipes developed in the past. In general, these prior art light pipes either emit light out of the end of the light pipe or emit light across the entire surface of the light pipe.

Orcutt, U.S. Pat. No. 4,422,719, discloses a light pipe with a translucent coating over a core material which allows the light which is transmitted axially to be dispersed radially around the light pipe. This translucent layer causes multiple random reflections which causes the entire width of the light pipe to be illuminated.

In U.S. Pat. No. 4,466,697, by Daniel, another type of construction of light pipe is disclosed. This light pipe consists of an extruded material and deposited within that material are co-extruded reflective particles. These particles randomly reflect the light and again as in Orcutt, there is no pattern to the light distribution. The light emitted from this prior art light pipe is also totally random and consequently the entire light pipe is illuminated.

In U.S. Pat. No. 4,195,907, Zamja, et al., there is disclosed an extruded optical fiber which contains dispersed air bubbles co-extruded within the fiber. These air bubbles inherently have a different index of refraction than that of the surrounding material thus they provide reflective surfaces similar to what is attained in Daniel with his reflective particles. Zamja's light pipe, as in Daniel, utilizes reflective surfaces that are randomly aligned and are not oriented in any manner. Because of the random orientation of the reflective surfaces, the reflection of the light transmitted axially down the fiber is also random and consequently the entire fiber is illuminated.

In U.S. Pat. No. 3,535,018, Vasilatos, there is disclosed an optical fiber which has notches cut into the fiber in order to provide reflective surfaces. These notches are positioned in a random manner and consequently there is no orientation of the emitted light coming from the fiber. Again, as in Daniel and Zamja, this causes the entire fiber to be illuminated across its entire width.

U.S. Pat. No. 5,671,306 describes a lighting structure for intensely illuminating a narrow linear region through a longitudinal slit in a lightguide. The lightguide has a reflective internal surface and a lens mounted in a slit shaped aperture. The lens includes a plurality of parallel planar prisms for directing light out of the lightguide, however, light is emitted only from the longitudinal slit in this device. Due to the planar construction of the parallel prisms the emitted light is in a single radial direction.

Considerable prior art may be seen in several U.S. patents to Whitehead, starting with U.S. Pat. No. 4,260,220. There are several design features which repeat in the Whitehead prior art. In Whitehead's light pipes, the light pipes are primarily designed to efficiently transmit light down the light pipe with minimal losses. This is achieved by constructing a light pipe from a sheet of material containing prismatic surfaces which are aligned parallel to the axis of the light pipe. These features reflect and redirect the axially transmitted light by exploitation of the principal of total internal reflection. Whitehead describes these prismatic surfaces as being in octature due to their construction consisting of a series of 90 degree prism faces which face each other. The light pipes in Whitehead go to great lengths to achieve near 100% efficient transmission of the axially transmitted light. In order to achieve this the prismatic elements are designed to reflect as much light as possible and not to redirect and transmit it, as in my invention. In U.S. Pat. No. 5,481,637, Whitehead discloses a light source reflector for a diffuse light source located within another light pipe. This reflector is constructed with prismatic surfaces aligned perpendicular to both the axis of the light pipe and the axis of the light source, but as in his other designs, the prismatic surfaces are utilized for efficient reflection within the light pipe not transmission of the light radially out of the light pipe. In addition, in U.S. Pat. No. 5,481,637 the prismatic reflector surrounds a diffuse light source which is a fluorescent type light source. The purpose of the prismatic reflector is to reflect the diffuse light rays from the light source light down the axis of the light pipe and prevent any radial emission of light. As before, the prismatic surfaces are in octature in order to efficiently reflect the light and prevent any light from passing radially through the prismatic surfaces of the light pipe.

In all of the Whitehead prior art no reference is made to the appearance of the light emitted from the light pipe. Whitehead is primarily concerned just with the efficient axial transportation of light not it's distribution or appearance to a observer.

Another prior art device described in U.S. Pat. No. 4,906,070 to Cobb, Jr. incorporates prismatic features utilizing prismatic films. These devices utilize prismatic films contained in a box, tube, or other housing in order to support and orient the film.

The prior art devices whether they are described as optical fibers, light pipes, lighting structures, or luminaries are generally designed to emit diffuse light across the entire width of the emitting area of the device. This diffuse, non-oriented emitted light results in the entire width of the emitting area being illuminated when viewed by an observer. Other prior art devices are designed to transmit light down a tube without emitting light from the sides of the tube.

Prior art manufacturing methods such as machining or sandblasting features in optical elements, results in surfaces that create diffuse emitted light and do not achieve highly efficient, specular, radial emission of light.

The present invention, on the other hand, consists of an optical light pipe with oriented prism surfaces which provide specular emission of light. These prism surfaces are oriented generally perpendicular to the axis of the light pipe. These prism surfaces act in conjunction with another media, with a different index of refraction such as air, to cause the axially directed light from the light source to be redirected out to the sides. Because of the controlled orientation of the prisms and the controlled manner in which the light is axially directed down the light pipe, there is a plane of light that is visible to an observer. This plane of light appears as a very narrow line of light much smaller than the width of the prismatic surfaces of the light pipe. Because this narrow, very intense plane of emitted light is visible to the observer, this light appears as if it is a highly collimated axially transmitted beam of light from the light source. Due to the curvature of the prismatic surfaces, only this plane of light which appears to be at the center of the light pipe is apparent to the observer. This gives the observer the impression that the light from the light pipe is emitted axially within the light pipe, not radially from the surface, as is actually the case. It is this phenomenon that gives the invention the appearance of a laser beam transmitted through a medium inside the light pipe. The uniform intensity and width of this line of light is an indicator of the optical efficiency of the light pipe in distributing light radially along its length.

SUMMARY OF THE INVENTION

A simulated laser light system according to the invention consists of an optical light pipe which emits light rays in a substantially radial direction. These light rays are emitted perpendicular to a tangent of the curved prismatic surface of the light pipe. In addition, these emitted light rays lie in a plane formed by the incident light ray and the normal to the prismatic surface of the light pipe. The emitted light from the light pipe appears to an observer to be a beam of highly collimated light emitted axially down the light pipe. This apparent co-axial beam of light located within the light pipe is created by a combination of physical optical effects and an optical illusion. The optical effects consist of the reflection and refraction of light rays originating from an axially located light source which emits substantially parallel light rays axially down the light pipe. These light rays are redirected by prismatic surfaces radially outward in a plane which is defined by the incident light ray and the normal to the prismatic surface of the light pipe. The prismatic surfaces redirect the light rays by a combination of reflection and refraction of the light rays within the specially constructed light pipe. The emitted light rays are uniform in all radial directions although they may vary in intensity and direction along the length of the light pipe. Due to the radially emitted light always appearing to be centered in the light pipe regardless of the observers location, the observer interprets this as the visible light originating from the center of the light pipe. This is an optical illusion due to the observer having binocular vision and incorrectly interpreting what he sees. In actuality the visible light is emitted from the surface of the light pipe.

The simulated laser light system light pipe, hereinafter referred to as SLLS, relies on an optical characteristic where the incident ray, the reflected ray, the refracted ray and the normal to the surface all lie in the same plane. In my SLLS, the light rays emitted from a light source are transmitted in a generally axial direction along the optical center line of a prismatic element. When these light rays strike the prismatic surfaces which posses a different index of refraction than the adjacent material, the light rays are both reflected and refracted. In all cases, either refraction or reflection, the light rays remain in the same plane as the incident light rays and the normal to the surface of the prismatic element. When the light rays finally emerge from the prismatic element, they emerge in a direction which is perpendicular to the tangent of the surface of the prismatic element. Despite being reflected and refracted the light rays still lie in the same plane as the incident ray, reflected rays and the refracted rays. It is this property that gives the SLLS its unique characteristic appearance of a laser beam traveling inside a rod or tube. For proper operation, the reflection and refraction inside the prismatic element should be specular, i.e., nondiffuse, otherwise, the emitted light rays will not have the characteristic appearance of a laser beam. If specular reflection and refraction is not maintained, multiple uncontrolled reflections and refractions will occur and the emitted light rays will not lie in the same plane as the incident rays. When this occurs, the emergent light rays will not have the appearance of a laser beam, i.e., a coherent highly collimated line of very intense light. Random orientation of the emitted light from the prismatic element will illuminate its entire width and thus it will not have the appearance of light emitted axially down the light pipe, rather, it will have the appearance of a neon or flourescent light. In addition, the radial and axial light distribution efficiency will be diminished over the specular case.

The term "SLLS" as used herein refers to an optical light pipe with integral prismatic surfaces oriented substantially perpendicular to a longitudinal axis of the optical light pipe and having a light source with an optical centerline which is generally parallel to the longitudinal axis of the optical light pipe.

BRIEF DESCRIPTION OF THE DRAWINGS

The invention will now be described in greater detail with reference to the preferred embodiments illustrated in the accompanying drawings, in which like elements bear like reference numerals, and wherein:

FIG. 4 is a cross sectional side view of a hollow tube SLLS illustrating the nomenclature used for defining the prismatic surfaces;

FIG. 5 is a side view of a solid rod SLLS rod illustrating the nomenclature used for defining the prismatic surfaces;

FIG. 6 is an optical system with the light source located in an optically dense medium, illustrating a light ray undergoing reflection and refraction;

FIG. 7 is an optical system with the light source located in an optically less dense medium, illustrating a light ray undergoing reflection and refraction;

FIG. 8 is a cross sectional side view of a solid rod SLLS illustrating the light rays originating from the light source and their subsequent reflection, refraction and emission from the SLLS;

FIG. 9A is a cross sectional side view of an SLLS tubular assembly;

FIG. 9B is a schematic cross sectional side view of an SLLS tubular assembly illustrating how the figures will be drawn in this patent application in order to clarify the illustrations;

FIG. 10A is a cross sectional side view of an SLLS illustrating several different light ray paths, with light originating from a light source at one end of a prismatic element and a reflective end portion;

FIG. 10B is a cross sectional side view of the SLLS of FIG. 10A without the optional reflective end portion;

FIGS. 16A, 16B, 16C, and 16D illustrate four different SLLS assemblies which utilize three different light source types and one different end configuration of the prismatic element;

FIGS. 21A, 21B, and 21C are side cross sectional views of alternate embodiments of an SLLS prismatic element;

FIG. 22 is a side cross sectional view of the SLLS of FIG. 21C illustrating the optical light path of an SLLS assembly with a tapered inner core and a light source located at one end;

FIG. 24A illustrates another manufacturing method that can be used to manufacture a prismatic element by forming the prismatic element in a female mold;

FIG. 24B illustrates an optional covering for the prismatic element manufactured in FIG. 24A;

FIG. 27A illustrates another manufacturing method for manufacturing a prismatic element with internal prismatic surfaces;

FIG. 27B illustrates an assembly of three of the prismatic elements shown in FIG. 27A, telescoped together to form a larger prismatic element;

FIGS. 28A and 28B are cross sectional side views of two solid rod SLLSs illustrating discontinuous prismatic features separated by optical conduit sections.

DESCRIPTION OF THE PREFERRED EMBODIMENTS

Figure 1:
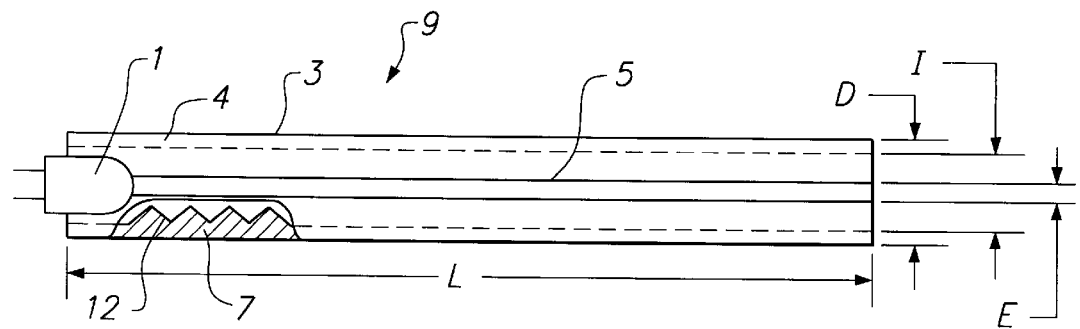
FIG. 1 is a side view partially in cross section of a hollow tube simulated laser light system (SLLS)

FIG. 1 illustrates in partial cross section, a first embodiment of a simulated laser light system (SLLS) according to the present invention. An SLLS assembly 9 includes a light source 1 and a prismatic element in the form of a tube. The prismatic element includes a wall 7 with an outer surface 3 and an inner prism surface 12. The visible emitted light appears to be emitted from a center 5 of the prismatic element. A partial cross sectional portion of FIG. 1 illustrates the wall 7 and an inner optical material 4. Also shown in FIG. 1 is the nomenclature that will be used to identify the important features of an SLLS. The outer diameter of the prismatic rod is identified with the letter D and the inner diameter of the prismatic rod is identified with the letter I. The width of the emitted visible light is identified with the letter E and the length of the prismatic tube is identified with the letter L.

Figure 2:
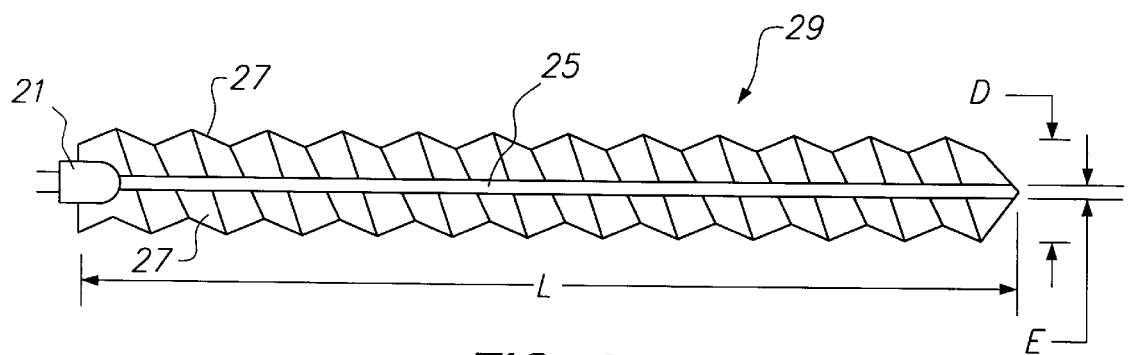
FIG. 2 is side view of a solid rod SLLS.

FIG. 2 illustrates the components of an alternative embodiment of the SLLS utilizing a rod like prismatic element 29 and a light source 21. The prismatic surfaces 27 are formed on the outside surface of the prismatic element. The light appears to be emitted from a center 25 of the prismatic element 29. As in FIG. 1, also shown is the nomenclature that will be used to identify the features of an SLLS. The outer diameter of the prismatic rod is identified with the letter D, the width of the emitted visible light is identified with the letter E, and the length of the prismatic rod is identified with the letter L.

Figure 3:
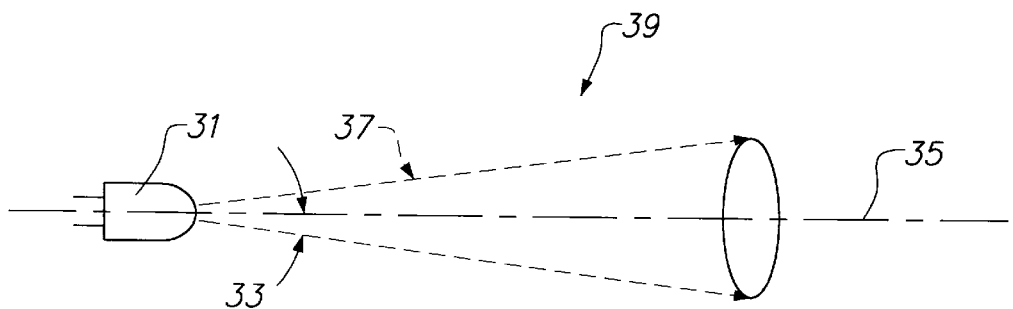
FIG. 3 is a side view of a light source illustrating a cone of emitted light rays emanating from the light source.

FIG. 3 illustrates a light source and its corresponding cone of emitted light, this is generally shown at 39. The light source 31 emits light in a cone of emitted light at angle 37. The half angle 33 of the cone of emitted light is measured from an optical centerline 35 of the light source. The light angle 37 is preferably an acute angle. Larger light angles may also be used, however, efficiently will suffer.

Various light sources can be successfully utilized in the invention such as an incandescent light, arc light, or solid state light sources such as light emitting diodes also known as a LEDS. Preferably, the light source 31 for use in the present invention emits a colored light, such as, red, green, or the like. The colored light source creates the appearance of a laser light with a diameter E which is less than an outer diameter D of the prismatic element. Preferably, the diameter E of the viewed light is less than one half of the diameter D of the prismatic element. Alternatively, the prismatic element may be tinted or colored and the light source may emit white light or another colored light.

FIG. 4 illustrates the nomenclature that will be utilized to describe additional features of a tube like SLLS. FIG. 4 shows an SLLS assembly 49 including a light source 41 and a prismatic element 42 having a series of prismatic surfaces 43. The helix angle "a" of the prismatic surfaces is measured from the perpendicular to the optical center line. The helix angle a" shown is approximately zero degrees. The pitch or spacing between the prismatic surfaces is identified as "P". The height of the prismatic surfaces are identified as H. A retroreflective feature 45 is located at the end of the prismatic element 49.

FIG. 5 illustrates the nomenclature that will be utilized to describe additional features of a rod like SLLS including a light source 51 and a prismatic element 52 having a series of prismatic surfaces 54. The helix angle "a" of the prismatic surfaces 54 is measured from a line perpendicular to the optical center line 56. This angle "a" is shown greater than zero degrees in the embodiment of FIG. 5. The pitch or spacing between the prismatic surfaces is identified as "P". The height of the prismatic surfaces are identified as H. A retroreflective feature 55 is located at the end of the prismatic element 52.

The retroreflective elements 45, 55 illustrated in FIGS. 4 and 5 reflect the light rays back into the prismatic elements. The retroreflective elements may also be omitted to produce a SLLS which emits a column of light out an end of the prismatic element increasing the simulated laser appearance of the device.

FIG. 6 shows a reflective and refractive optical system including a light source 61 located in an optically dense medium 62. The normal to the surface of the optically dense medium 62 is shown at 63. An emitting surface is shown at 64. The incident ray is shown at 65. The emergent refracted ray is shown at 66. The internally reflected ray is shown at 67. An additional prismatic surface is shown at 68. As can be seen in FIG. 6, incident light ray 65, is both refracted and reflected when it passes from optically dense medium into a less optically dense medium 69 having a lower index of refraction than the optically dense material 62. The angle of the incident light ray 65 with respect to the normal line 65 is identified with the letter E1. The angle of the emergent ray 66 is identified with the letter E2. As is well understood, the angle E2 may be calculated by applying the standard formulas for geometrical optics. These formulas may be found in "Basic Optics and Optical Instruments, Revised Edition" 1997, Published by Dover Publications, Inc. Mineola, N.Y. which is incorporated herein by reference. As can be seen in FIG. 6, the emergent light ray 66 is refracted away from the normal to the surface 63. FIGS. 6 and 7 illustrate an optical principal used in the present invention, this principal is that the incident light ray 65, the reflected ray 67, and the normal 63 all lie in the same plane, i.e., the plane of the drawing. This phenomenon is utilized in the present invention.

FIG. 7 illustrates another optical system in which a light source 71 is located in an optically less dense medium 79. The optically dense medium 72 abuts the optically less dense medium and the normal to the surface of the optically dense material is shown at 73. The emergent surface is identified at 74 and the incident light ray is shown at 75. The refracted light ray is shown at 76 and the corresponding reflected ray is shown at 77. An additional prismatic surface is identified at 78. As in FIG. 6, the incident angle of the light ray is labeled E1 and the angle of the refracted ray is labeled as E2. In contrast to the refracted light ray shown in FIG. 6, the refracted light ray of FIG. 7 identified at 76 is refracted towards the normal 73 rather than away from the normal as in FIG. 6. In accordance with the law of reflection, the incident ray 75, the reflected ray 77, and the normal 73, all lie in the same plane, i.e., the plane of the drawing.

FIG. 8 illustrates a cross sectional view of a rod type SLLS assembly 80. The light source 81 is shown emitting light rays which undergo reflection and refraction and are eventually emitted from the SLLS. There are many different possible light paths shown, all of which will result in emitted light rays from the SLLS. This light emission can be the result of a single reflection and refraction event as shown with forward emitted light rays 82, 83, 84, and 85. The emitted light rays may have also undergone multiple reflections, such as that shown by light ray 90, which finally emerges as light rays 86 and 88. Additionally shown is light ray 87, which is a reflected portion of light ray 90. Another possible multiple reflection path is illustrated with light ray 91 which originates from light source 81 and is eventually emitted as light ray 92 after it is retroreflected due to surfaces 94 and 95. As can be appreciated the included angle 98 between the prismatic surfaces 96 and 97 influences how many times the light rays of an SLLS are reflected prior to being emitted from the prismatic element. For a prismatic element having an index of refraction of 1.60 with a surrounding medium 89 of air with an index of refraction of 1.0, if the angle between the prism faces 98 is large, for example 140 degrees, the emitted light will consist of light rays that have only undergone a single reflection such as rays 82, 83, 84 and 85. This will result in a highly directional viewing angle and the majority of the emitted light will be in a direction away from the light source. With the addition of a retroreflective feature such as that consisting of surfaces 94 and 95, the light rays reflecting off the retroreflective surfaces can be reversed in direction relative to the optical centerline 100, and reflected, refracted and finally emitted as shown at light ray 92. This utilization of a light ray in combination with a retroreflective feature in this manner will have the effect of increasing the viewing angle of the SLLS.

FIG. 9A illustrates a hollow tube SLLS 102 with a light source 101, a prismatic element 104 and a retroreflective end portion 103. In order to clarify the drawings, some of the lines illustrating the features of the prismatic element will be omitted. Thus, the SLLS shown in FIG. 9A will be drawn as shown in FIG. 9B in order to facilitate illustrating the light ray paths within the prismatic element.

FIG. 9B illustrates the prismatic tube SLLS 106 of FIG. 9A including the prismatic tube 107, the light source 111, and the retro-reflective end portion 107.

FIG. 10A illustrates some of the possible reflection and refraction events that will result in light being emitted from a hollow tube prismatic element SLLS 113. The SLLS assembly 113 includes the light source 112, a prismatic element 120, and a reflective end portion 132. Light ray 114 is a light ray originating from light source 112 which is reflected off a prismatic surface resulting in light rays 115 and 117. After passing through the prismatic element, light ray 115 is emitted as shown as light ray 116. The reflected ray 117, originating from ray 114 is also refracted as shown as light ray 118. Finally, this refracted ray 118 emerges from the surface of the prismatic element and is shown as ray 119. Ray 124 is shown refracting through the prismatic element and emerging as ray 125. Also shown is ray 127 originating from light source 112. Ray 127 is refracted through reflective end portion 132, reflects off surface 131, is then additionally reflected off surface 130 and finally emerges from the surface of the prismatic element as emitted ray 135. The optical axis of the SLLS is shown at 133.

As discussed with reference to FIG. 8, if the SLLS is designed to utilize redirecting the light rays with a single refraction and/or a single reflection event, the emitted light will be highly directional. In other words, the emitted light will be highly oriented relative to the central optical axis of the SLLS. The emitted light will still lie in a plane defined by the incident light ray and the normal to the prismatic surface of the SLLS, but the emitted light rays will all be directed in the same direction relative to the central optical axis of the light pipe. This situation is acceptable when the observer's line of sight is always located at the same angle relative to the axis of the light pipe. But in situations where the observer is in varying locations relative to the axis of the light pipe, it is desirable to increase the viewing angling of the emitted light. It is possible to increase the viewing angle by several methods.

One method of increasing the viewing angle is to utilize the emitted light from two light sources located at opposite ends of the SLLS. See FIG. 18D which will be discussed later in detail. By utilizing light traveling in opposite directions in the SLLS and by designing the angle of the emergent light from the light pipe to be at an angle other than 90 degrees to the light pipe axis, it is possible to increase the viewing angle. The combination of the emitted light from two light sources interacting with the prismatic surfaces which emit light in a direction other than 90 degrees relative to the axis of the light pipe combine to give a wider viewing angle. The resultant viewing angle will be the combination of the two viewing angles created by the two light sources. The two light sources may either be two individual light sources or may be a single light source in combination with a reflective feature located at the opposite end of the light pipe. This reflective feature would be utilized to reflect light back down the light pipe in a direction opposite to the original direction. This is shown in FIGS. 8 and 10. This reflection and redirection back towards the original light source is defined as retroreflection. The reflective feature utilized for retroreflection may be a simple mirror, a reflective coating, or a retroreflective element which utilizes the principal of total internal reflection of light with appropriately angled transparent surfaces (see FIGS. 10A and 18A). A retroreflective element which utilizes the principal of total internal reflection is easily incorporated in the prismatic element itself as shown in FIGS. 4 and 5. It may be desirable to retroreflect the light rays slightly off axis of the incident light ray to achieve greater or lesser light output in a specific area of the light pipe.

FIG. 10B illustrates a hollow pipe SLLS without a retroreflective element on the end opposite the light source 112. As shown in FIG. 10B, the some of the light rays are reflected, refracted, and emitted from the sides of the prismatic element 120 as light rays 116, 119, 121, and 125 while light rays 127 and 128 which are substantially parallel to the center axes 133 of the prismatic element are emitted in a beam from the end of the prismatic element. In this manner the prismatic element acts as a filter to extract non-parallel light rays. The remaining substantially parallel light rays form a highly collimated beam emitted from the end of the prismatic element.

Figure 11A:
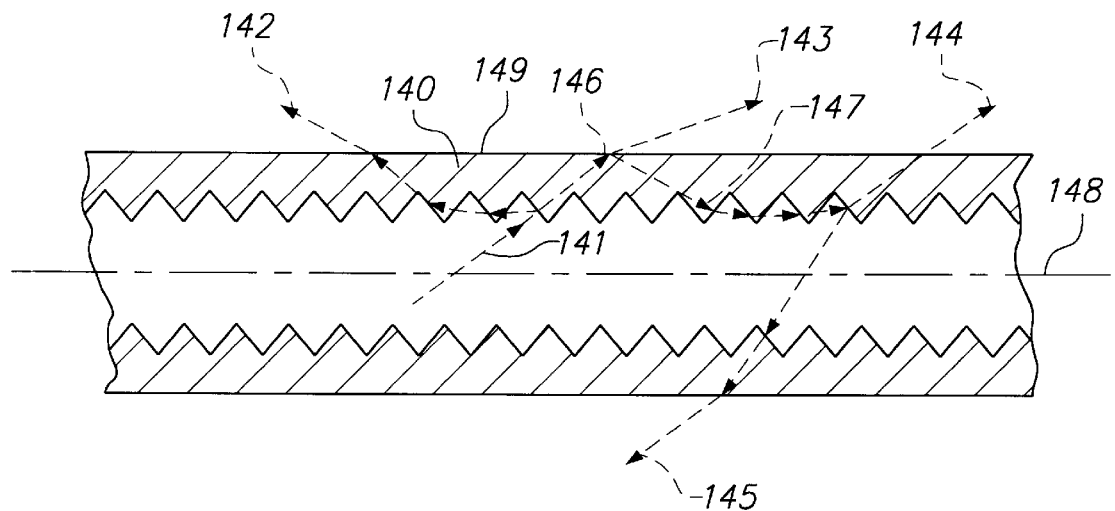
FIGS. 11A, 11B, and 11C are cross sectional side views of a portion of an SLLS prismatic element and the different light path scenarios corresponding to three different incident angles of light directed down the axis of the prismatic element.
Figure 11B:
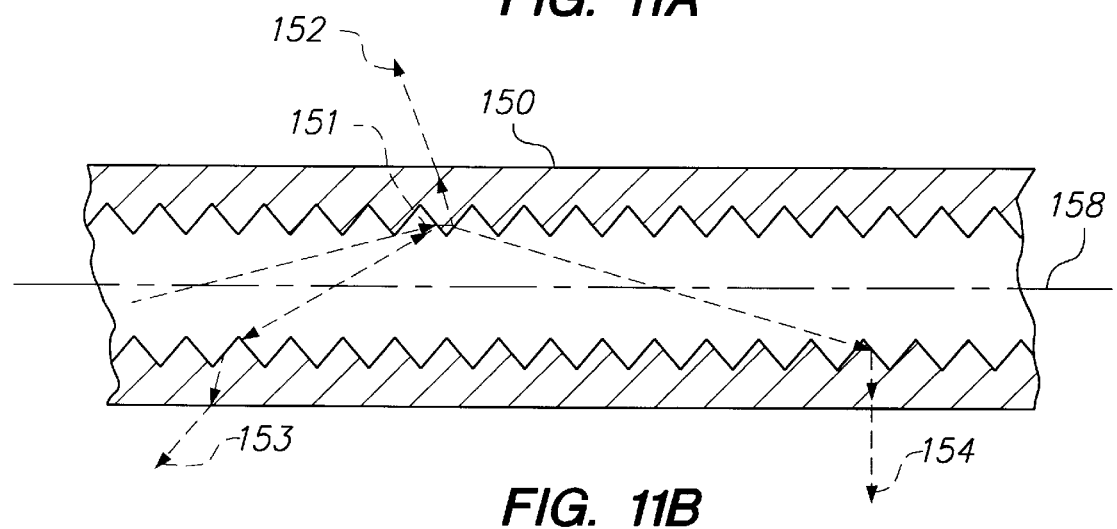
Figure 11C:
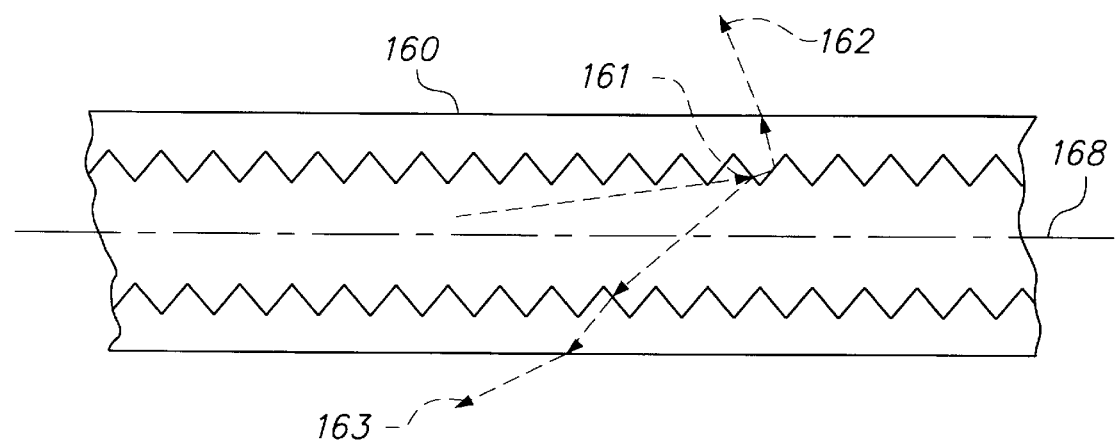

Another method of increasing the viewing angle is to cause multiple reflections within the prismatic element in order to increase the variation in the incident angles of the light rays striking the prismatic surfaces. The effect of varying the light ray incident angles on the direction of the emitted light rays is shown in FIGS. 11A, 11B, and 11C. FIG. 11A illustrates a portion of a prismatic element with optical center line 148, incident ray 141. Incident ray 141 is shown having multiple optical paths. The wall of the prismatic element is also a reflective surface at 146. As is shown in the FIG. 11A, a portion of ray 141 is reflected and is shown as ray 147. Ray 147 is further refracted and reflected, finally emerging as rays 144 and 145. Shown in FIG. 11A is an incident light ray 141 with an angle relative to the optical centerline 148 of approximately 45 degrees. From this single incident light ray, four different light rays with four different emergent angles are generated. These four differently directed light rays are shown at 142, 143, 144 and 145. In addition to increasing the viewing angle with the large number of reflection and refraction events shown in FIG. 11A, the quality of the specular nature of emitted light maybe sacrificed. The reason for the degradation in the specular nature of the emitted light is due to slight imperfections in the construction of the prismatic surfaces and the degree of transparency of the materials used in the construction of the prismatic element 149. The result of these multiple reflections and refractions is not only to broaden the viewing angle but it may also act to broaden the apparent width of the emitted light from the prismatic element.

Shown in FIG. 11B is the resulting reflections, refractions and ultimate emergence of light rays which originate from a incident light ray 151. Incident ray 151 is at an incident angle of approximately 20 degrees relative to the optical center line 158 of the prismatic element 150. Incident ray 151 is reflected and emerges as ray 153. Light ray 151 is also refracted and reflected and emerges as ray 152. Light ray 151 is additionally refracted and then finally emerges as ray 154. As can be seen in FIG. 11B, the number of reflection and refraction events which occur prior to the emergence of light rays 152, 153 and 154 is dramatically reduced from that shown in FIG. 11A. The corresponding appearance of an SLLS utilizing light rays with this incident angle would be similar to that shown in FIG. 16B at 236.

Shown in FIG. 11C is incident light ray 161 which is at an angle relative to the optical axis 168 of approximately 7 degrees. As can be seen in FIG. 11C, this incident ray results in two emitted rays 162 and 163. As previously mentioned, the greater the number of reflection and refraction events that occur within the prismatic elements, the more diffuse, i.e. less specular is the emitted light and the less well defined is the apparent laser beam effect. Thus, the light ray in FIG. 11C would provide the most well defined apparent laser beam effect. FIGS. 11A, 11B, and 11C illustrate the multiple reflections and refractions that can occur in a prismatic element. What is important is that all of these multiple reflections and refraction all occur in the same plane. In FIGS. 11A, 11B, and 11C, despite multiple reflections and refractions, all of these light rays lie in the same plane.

As can be appreciated, the angle of any emitted light rays are not only determined by the incident angle of the incident light rays, but also are determined by the angle of the prismatic surfaces and the angle of the emergent surface relative to the optical axis. In addition to these factors, the angle of the emitted light ray is also influenced by the index of refraction of the materials used in the prismatic element and the index of refraction of the surrounding medium. The intensity of any given emergent light ray will be governed by how many times it is reflected, refracted and essentially divided into two or more light rays. Thus, the intensity of the emergent light rays 162 and 163 shown in FIG. 11C would be greater than either of those shown in FIG. 11A. The intensity of a light ray will decrease due to absorption losses in the material making up the prismatic element. The intensity of the emitted light rays will also decrease with the increasing number of reflections occurring within the light pipe prior to being emitted. Because of these factors, the brightest most well defined simulated laser light appearance is obtained with light ray angles which are small relative to the optical axis of the light source, similar to those shown in FIG. 11C.

Figure 12:
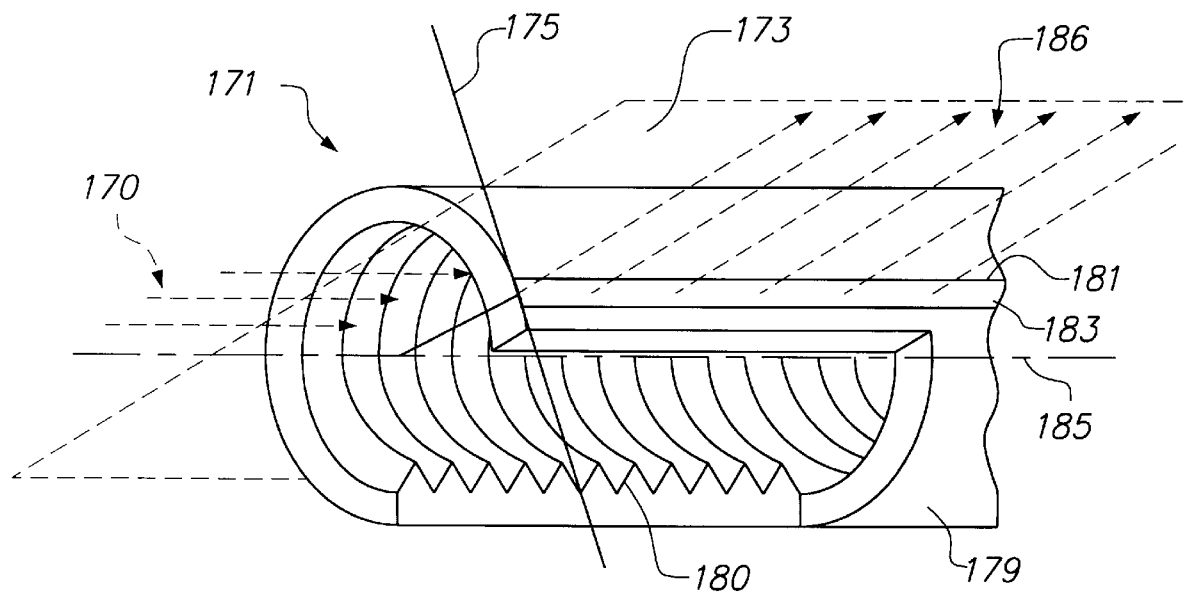
FIG. 12 is a perspective view partially in cross section of a tubular SLLS prismatic element illustrating the light rays emerging from the surface of the prismatic element and a plane that is defined by the incident light rays and a line tangent to the surface of the prismatic element.

FIG. 12 illustrates how the incident light rays and the emitted light rays of an SLLS can all lie in the same plane. Shown in FIG. 12 is a partial cross section of a circular prismatic element 171, with an optical center line 185. A group of incident light rays is shown generally at 170 and a group of emitted light rays is shown generally at 186. The incident light rays 170, enter the circular prismatic element and strike the internal prismatic surfaces 180 and are reflected and refracted and finally emitted as shown at 186. These incident rays, the reflected and refracted rays (not shown) and finally the emitted light rays all lie in the same plane which includes the centerline 185. This plane is shown with dashed lines at 173. To an outside observer, the light rays in this plane appear as a single line of light, shown at 183. Emergent light rays 186 are from the surface of the prismatic element 179 perpendicular to a tangent to the surface of the tube. This tangent to the surface of the prismatic element is shown at 175. It is not apparent to an observer that the light rays are actually coming from the surface of the prismatic element, to the contrary, to the observer, they appear to be coming from the center of the prismatic element itself. The cross section of the circular prismatic element is shown at 180. A point on the visible line of light apparent to an observer is shown at 181. Plane 173 passes through the optical center line 185 and a point on the visible line 181. As previously stated the incident light rays 170, the refracted light rays (not shown) and the emitted light rays 186 all lie in the same plane shown at 173. The optical centerline 185 also lies in this same plane 173.

Figure 13:
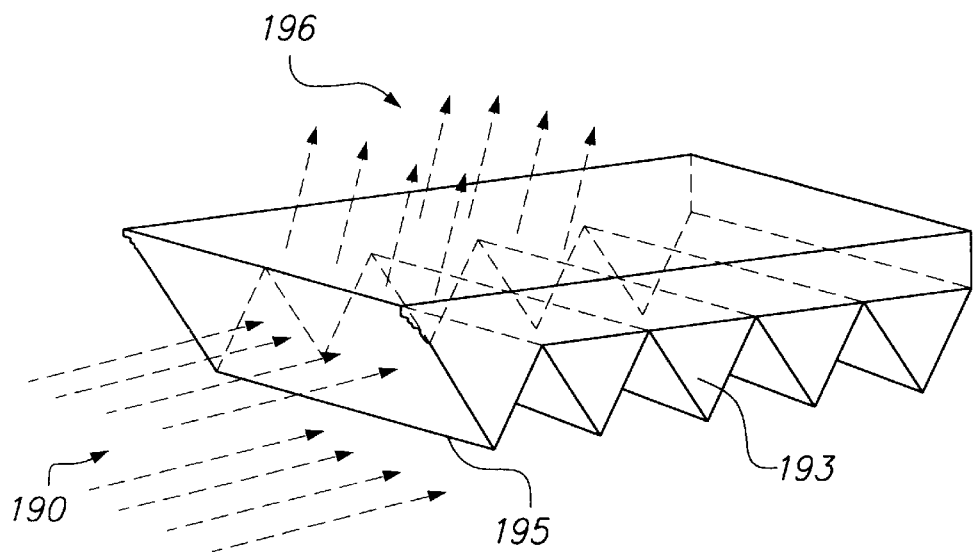
FIG. 13 is a perspective view of a planar prism array and the light emitted from the planar prism array.

The curvature of the prismatic element of the SLLS is partially responsible for its unique appearance. As the radius of curvature of the prismatic element is increased, the width of the beam of visible light is also increased. Conversely, when the radius of curvature is decreased the width of the beam of visible light is also decreased. FIG. 13 illustrates what occurs when light rays strike a prismatic element which is flat or planar rather than curved. In FIG. 13, the planar prismatic element 195 is shown in partial cross section at 193. Incident light rays shown generally at 190 strike the prismatic surfaces on the planar prismatic element and are reflected and refracted and finally emitted as light rays shown generally at 196. As can be seen in the FIG., the emitted light rays are emitted across the entire width of the prismatic planar element. Thus to an outside observer, the entire width of the plane would be illuminated and there would not be a well defined area of intense light as with an SLLS.

Figure 14A:
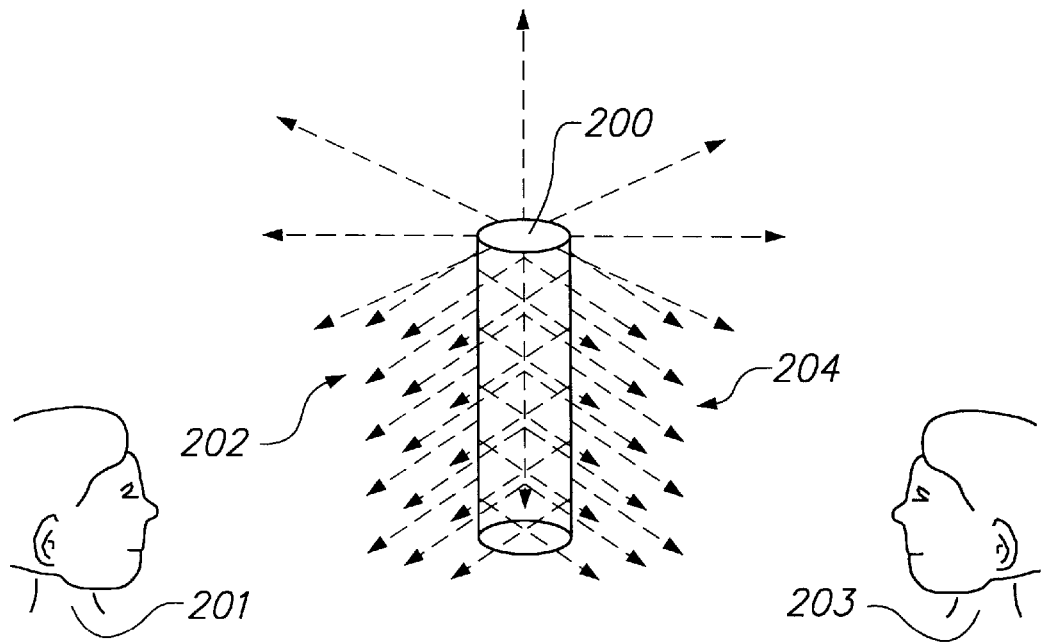
FIG. 14A is a perspective view of a prior art light pipe and its corresponding appearance to outside observers.

FIG. 14A illustrates a prior art light pipe 200 and its appearance to a pair of outside observers. The outside observers are shown at 201 and 203. The emitted light rays are generally shown at 202 and 204. Observers 201 and 203 both observe that the entire width or diameter of the light pipe 200 is illuminated. The appearance of this prior art light pipe is similar to a neon or flourescent light with diffuse light being emitted from the entire diameter of the light.

Figure 14B:
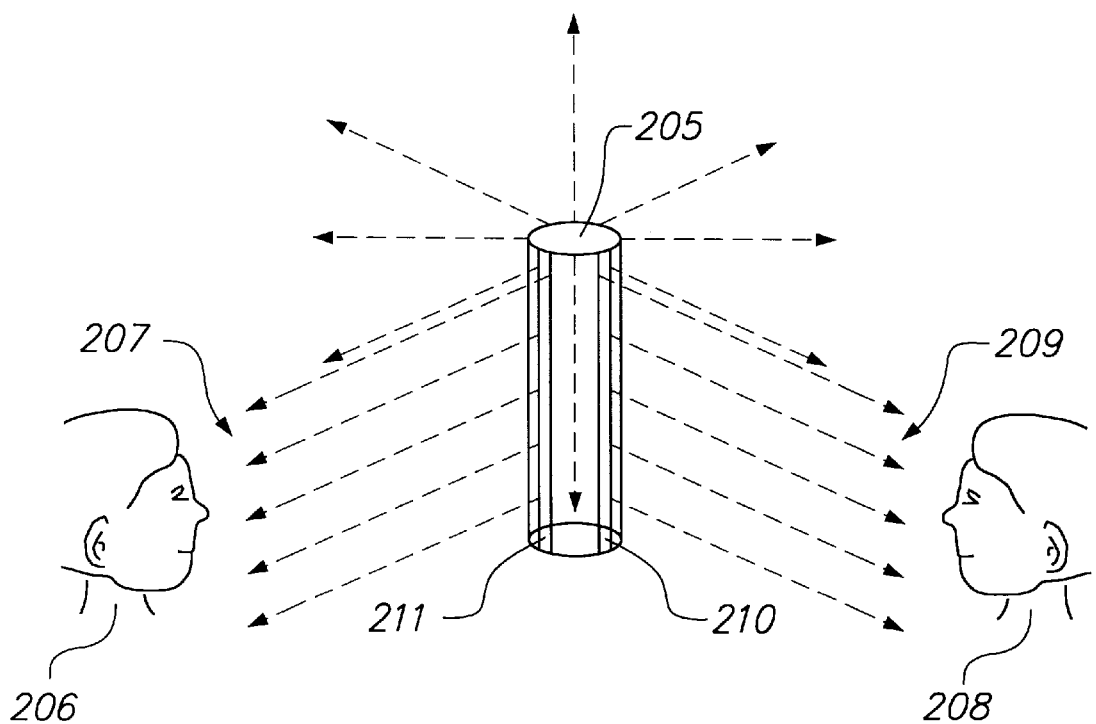
FIG. 14B is a perspective view of the SLLS and its corresponding appearance to outside observers.

FIG. 14B illustrates an SLLS 205 according to the present invention. As in FIG. 14A, there are two observers 206, 208. The emitted light rays from the SLLS are shown at 207 and 209 and the corresponding visible lines of light are shown at 211 and 210. As shown in FIG. 14B, observer 206 would only see illuminated line of light 211 which is directed perpendicular to the tangent in his direction. Observer 208 would see a different illuminated line of light shown as 210 and he would not be able to see the line of light 211 that observer 206 sees. Observer 206 would only see light rays shown generally at 207 forming illuminated line of light 211. Observer 208 would only be able to see light rays 209 and the corresponding formed line of light 210. Thus, in summary, an observer of an SLLS will only be able to see the light rays that are directed towards them along a plane that is perpendicular to the tangent to the surface of the SLLS which is nearest to them. The light visible to each observer is similar to a laser light projected into a partially reflective medium, such as smoke.

Figure 15A:
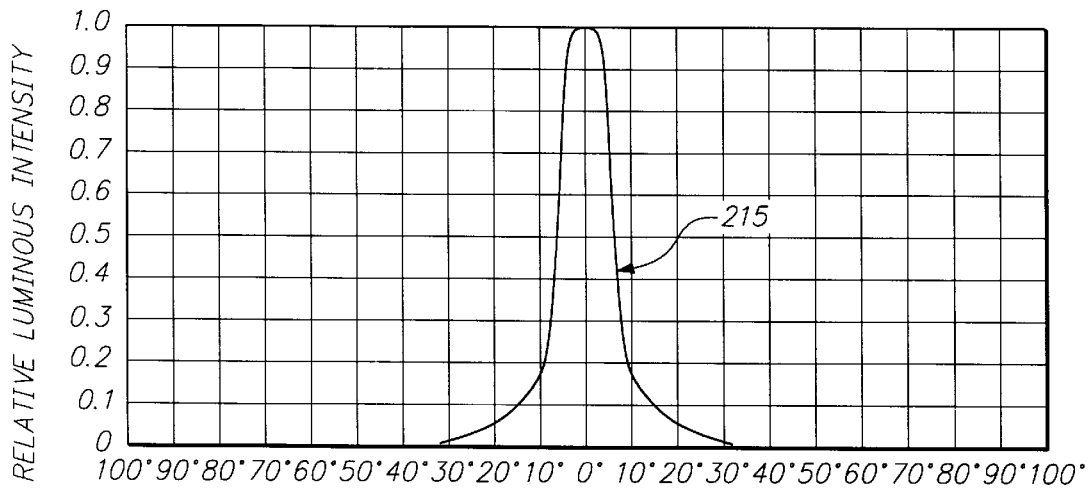
FIGS. 15A, 15B, and 15C are graphs illustrating three different characteristic curves of spatial light distribution versus relative intensity for three different light sources.
Figure 15B:
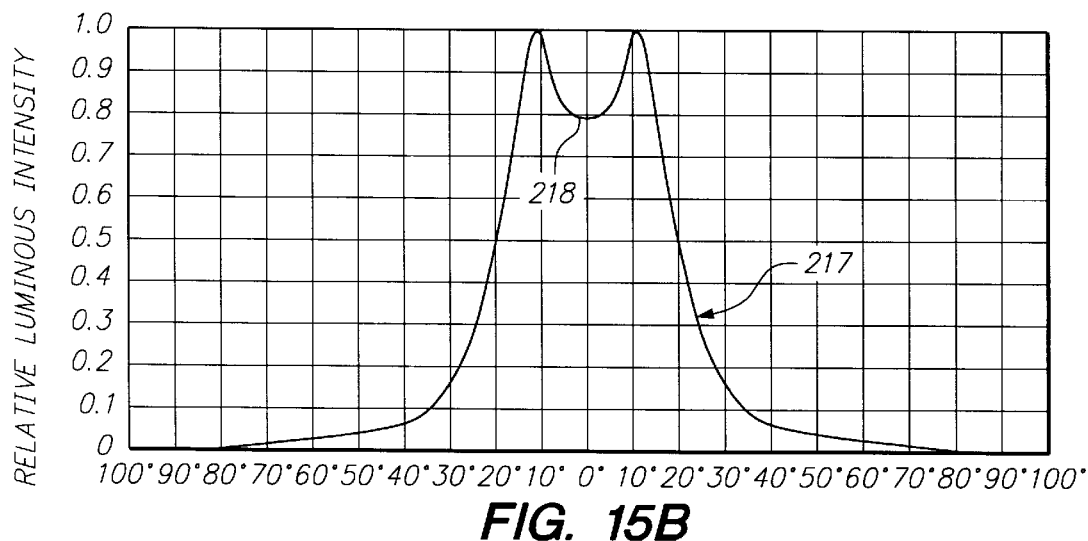
Figure 15C:
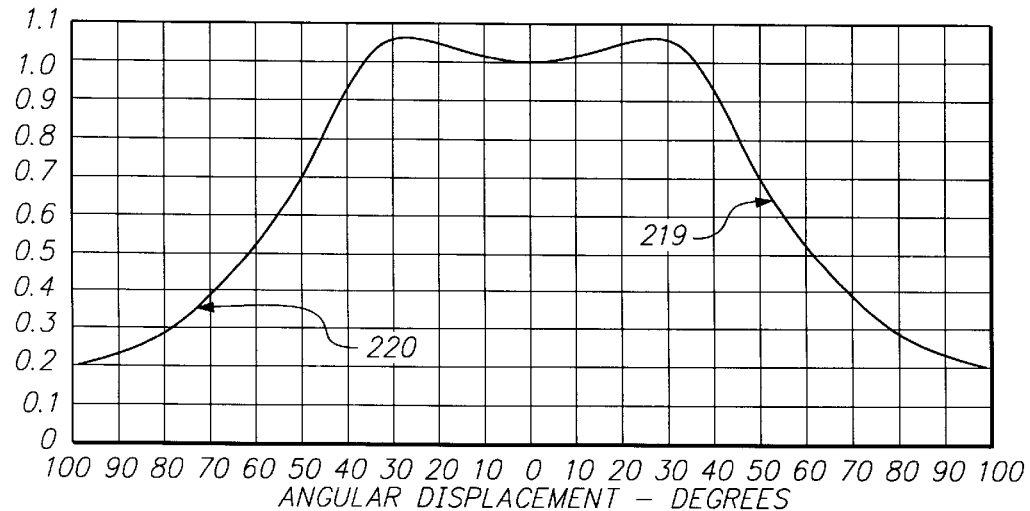

FIGS. 15A, 15B, and 15C show three different relative luminous intensity versus spatial radiation patterns for three different light sources. As previously mentioned, the light distribution pattern of a light source has a pronounced effect on the appearance of an SLLS.

In practice, the cone of light emitted from a light source can be described in many different ways but the most useful method to characterize the light source and its corresponding light cone angle is by measuring its light output versus angular displacement. This information is usually available for LED type light sources directly from the manufacturer. This information is typically presented in a graphical format of relative luminous intensity versus spatial distribution (angular displacement). Three of these types of curves are shown in FIGS. 15A, 15B, and 15C. The curves in FIGS. 15A, 15B, and 15C are for LED's (light emitting diodes) but could also be for any type of light source, combined reflector or lens focusing system. The curves in FIGS. 15A, 15B, and 15C illustrate the variety of spatial distribution curves possible. In order to construct an SLLS with a very sharply defined laser beam appearance, a light source with a spatial distribution curve as shown in FIG. 15A could be utilized. When this light source is combined with the appropriately sized cylindrical prismatic element, a very sharply defined laser beam appearance will be obtained. Extremely small SLLS may be constructed with a light source which acts as a point source such as an LED or laser diode. For uniform appearance and light output from the SLLS, the light source and its corresponding optical centerline should be located on the prismatic elements optical centerline.

According to an alternative embodiment of the invention, the light source may be located off of the optical centerline of the prismatic element, however, uniform intensity around the SLLS will suffer. The light source may also be located outside of the prismatic element. For uniform intensity an external light source located outside of the prismatic element should be a ring of light positioned around the prismatic element.

When a light source with the spatial light distribution curve shown in FIG. 15A is utilized with a prismatic element with a 70 degree included angle between its faces, an outer diameter of 0.200 inches, and a length of 6 inches, it would emit light with the appearance of that shown in FIG. 16D at 238. The width of the beam of the emitted light, is approximately 0.030 inches. Prismatic element 228 shown in FIG. 16D also incorporates a retroreflective end portion 232 which adds to the intensity of the emitted light rays at the end of the prismatic element opposite the light source.

FIG. 15A illustrates a light source which has a very narrow and well defined cone angle. A light source with this type of light distribution profile is especially useful in the present invention. Line 215 on the graph of FIG. 15A characterizes the spatial light emission of the light source. This particular graph depicts a light source with 50 percent of its intensity at a 7 degree cone half angle. In other words, the point where the light output diminishes to 50 percent of its relative intensity, corresponds to a cone half angle of 7 degrees. Thus, the light cone angle as shown in FIG. 3 at 37, is two times this or 15 degrees. This light cone half angle is defined as the angle from the optical centerline where the relative light intensity drops to 50% of its highest value.

FIG. 15B also illustrates another relative luminous intensity versus cone angle for another light source. In this particular graph, there is seen a characteristic dip in the curve, centered about the optical axis centerline. This dip in the curve is shown at 218. A light source with a light output curve such as this can be obtained with an LED or the combination of a light source and reflector. For example, if a light source is located at a point other than the focal point of a parabolic or elliptical reflector, a light distribution curve such as the one in FIG. 15B can be obtained. Using a light source such as this, with diminished light output along the centerline of the optical axis of the prismatic tube, will diminish the amount of light that is able to be transmitted towards the end of the prismatic element. As can be appreciated, if this reduction in light output along the axis of the tube is taken to an extreme, then any type of retroreflective feature at the end of the prismatic tube would not be useful. FIG. 15B illustrates a light source with a relative luminous intensity that decreases to 50 percent at a light cone angle of 2 times 20 or 40 degrees. Thus, for example, if a light source with an angular displacement curve such as that shown in FIG. 15B is utilized for an SLLS, the appearance of the light emitted from the prismatic element would be similar to that illustrated in FIG. 16A, the light pipe shown generally at 225. The light emitted from prismatic element 225 is shown in the shaded area at 235 and can be seen to be very broad at the base which corresponds to the location of the light source, (not shown).

In FIG. 15C a light source is shown with a 50 percent relative luminous output over a cone angle of 125 degrees. A light source such as this in combination with a prismatic element of the present invention would result in a very broad beam of visible light located at the end of the SLLS adjacent to the light source. This would also be a very short visible beam. As explained earlier, a very sharply defined intense simulated laser beam appearance is best obtained with a light source with a narrow light cone angle. Thus, a light source with a light distribution curve such as the one illustrated in FIG. 15C would not give good results. In order to achieve the SLLS effect, a light source with the light output characteristics similar to that of FIG. 15A should be utilized.

Shown in FIG. 16 are four different configurations of SLLS. The first three configurations FIGS. 16A, 16B, and 16C utilize the same type of prismatic element but utilize light sources with different light cone angles. The prismatic elements for all three of these configurations are identified at 225. The visible light produced from the three different SLLS assemblies is identified at 235, 236, and 237. The length of the visible light is identified with the letter "T" and the diameter of the prismatic element is identified with the letter "D". The SLLS shown in FIG. 16A utilizes a light source with the largest light cone angle. This large light cone angle results in a wide area of visible light that is short in length. The visible emitted light shown at 236, in FIG. 16B, is longer because the transmitted light of this particular SLLS has a more narrow light cone angle for a given light output, thus, it has a longer visible length. Shown in FIG. 16C, at 237 is yet again a longer visible light area with a narrower base. Shown in FIG. 16D is an SLLS which consists of a prismatic element 228 similar to the ones utilized in the SLLS assemblies of FIGS. 16A, 16B and 16C but it is longer in length and also contains a retroreflective element 232. As can be seen in FIG. 16D, the visible light area 238 is the longest of all of the SLLS shown in FIGS. This long length of visible emitted light is achieved by utilizing the light source used in FIG. 16C and incorporating retroreflective element 232. Thus, the entire length L of the prismatic element is illuminated to width E.

There are endless possible configurations of SLLS incorporating one or more light sources or a single light source with one or more prismatic elements with or without reflective end features. FIGS. 17, 18, 19, and 20 illustrate several of the many different configurations that are possible. As can be appreciated these are only a few of the possible configurations and do not limit the possible configurations.

Figure 17A:
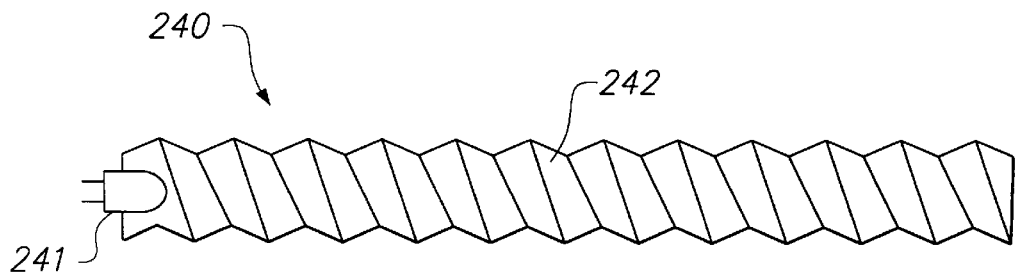
FIGS. 17A, 17B, and 17C are side views of three different light source configurations for an SLLS assembly, FIG. 17A has a single light source located at one end, FIG. 17B has a single light source located at one end and has a retroreflective element located at the opposite end, and FIG. 17C has two light sources, one located at each end.
Figure 17B:
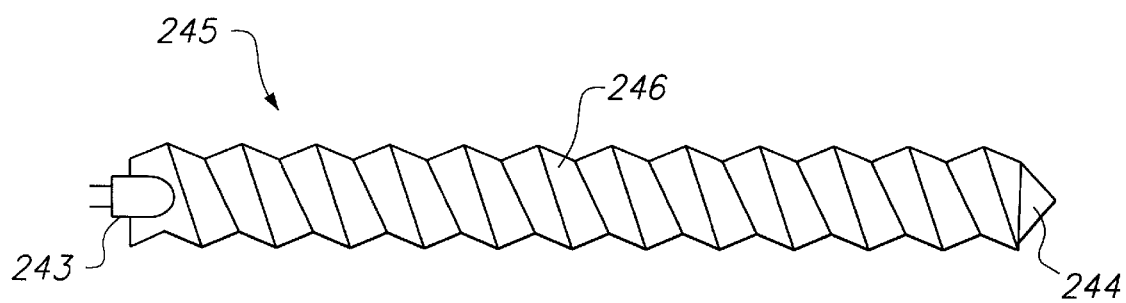

Shown in FIG. 17A is an SLLS 240 consisting of a single light source 241 and a prismatic element 242. Prismatic element 242 is shown as a rod like structure with external helical prismatic surfaces. Shown in FIG. 17B is an SLLS 245 similar to that shown in 17A, with a light source 243, prismatic element 246 and retroreflective end portion 244.

Figure 17C:
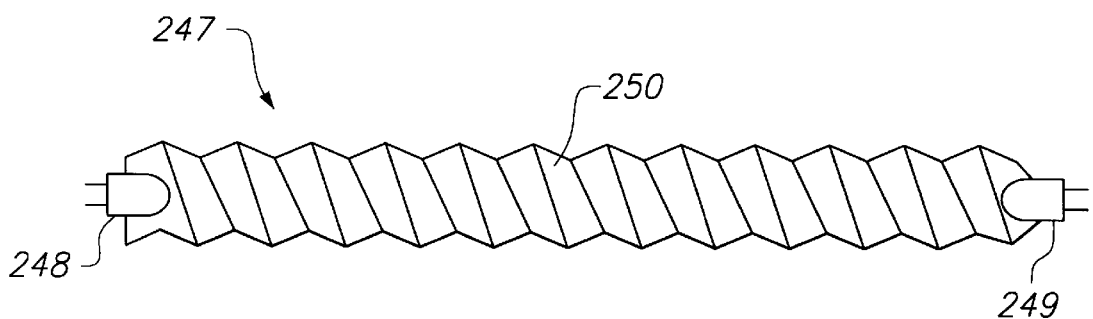

Shown in FIG. 17C is an SLLS 247 consisting of two light sources 248, 249 and a prismatic element 250. The light sources 248, 249 in this particular embodiment can emit the same wavelength of light, in other words, the same color, or the two light sources 248 and 249 can emit light of differing colors. When the light sources are of differing colors, then the colors will actually blend along the length of the SLLS. This will result in two different colors of emitted light at each end of the SLLS and a blend of these two colors along the length of the SLLS. However, the light of a particular color would be most intense at the end adjacent to the light source. For example, the colored light emitted from 249 and redirected by prismatic element 250 would be most intense adjacent to light source 249. An example of the mixing of the colored light is, if light source 248 is red and light source 249 is blue, the mixed color in the middle of the prismatic element would be purple.

Figure 18A:
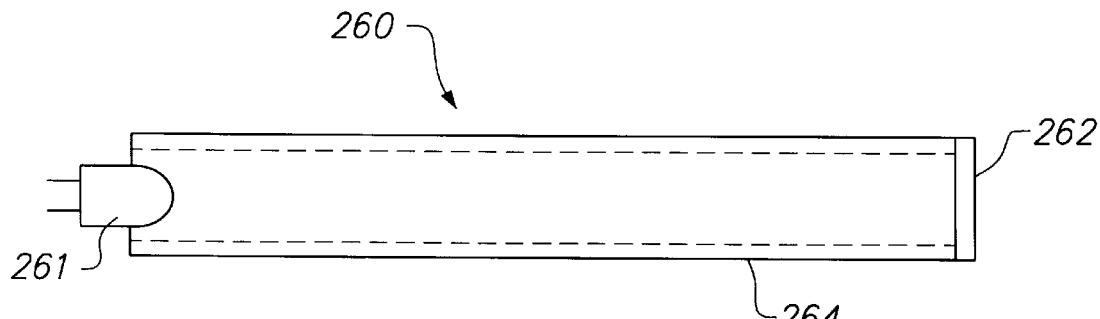
FIG. 18A is a side view of an SLLS assembly consisting of a prismatic tubular element, a light source at one end, and an optional reflecting element at the opposite end from the light source.

In FIG. 18A, an SLLS 260 includes a light source 261, tubular prismatic element 264, and optional reflective surface 262. Reflective surface 262 can consist of a material such as plastic covered with a reflective metallic coating to act as a mirror. Thus reflective surface 262 acts as a retroreflective surface which redirects light rays back towards the light source 261.

Figure 18B:
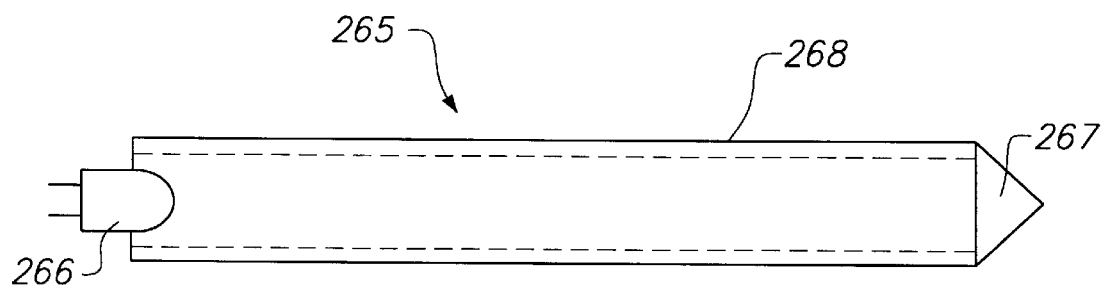
FIG. 18B is a side view of an SLLS assembly consisting of a prismatic tubular element, a single light source located at one end, and a retroreflective element located at the opposite end from the light source.
Figure 18C:
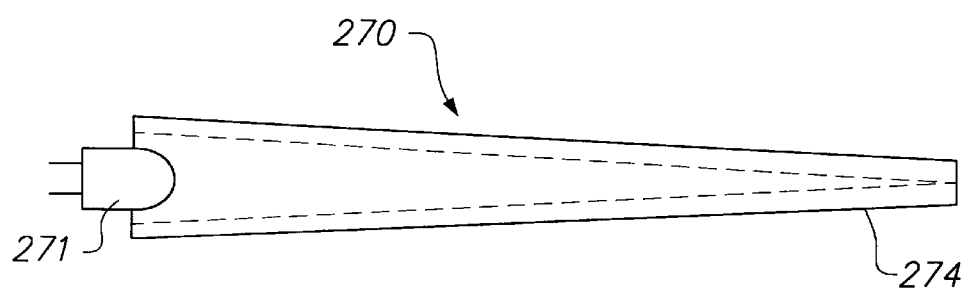
FIG. 18C is a side view of a tapered prismatic tube SLLS having a single light source located at the opposite end from the narrowest portion of the taper.

Shown in FIG. 18B is another embodiment of an SLLS 265. As in FIG. 18A, the prismatic element 268 is a tubular type element with a hollow core. The light source 266 is located at one end of the prismatic element with a retroreflective end feature 267 located at the opposite end. Retroreflective end feature 267 consists of a conical end surface which utilizes the principal of total internal reflection in order to reflect light rays back towards the light source. Using this principal it is possible to obtain a more uniform emitted light from the end of the SLLS opposite the light source.

Shown in FIG. 18C is yet again another embodiment of an SLLS 270 including a light source 271 and a tapered prismatic tubular element 274. The purpose of this tapered prismatic element is to obtain a more uniform light along the SLLS length. By utilizing a tapered prismatic element 274 it is possible to capture a higher concentration of light at the end of the SLLS, opposite the light source 271.

Figure 18D:
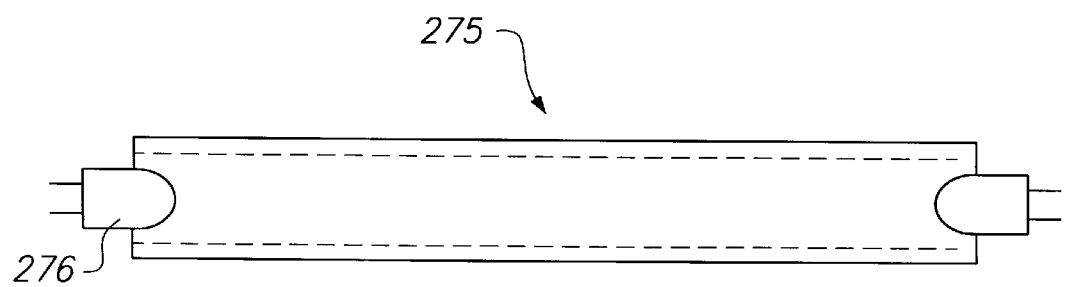
FIG. 18D is a side view of a prismatic tube SLLS with a light source located at each end.

Shown in FIG. 18D is another alternate embodiment of SLLS 275 including light sources 276, 277. As previously discussed with respect to FIG. 17C, these light sources 276, 277 can be of either the same wavelength and color or differing wavelength and differing color.

Figure 19A:
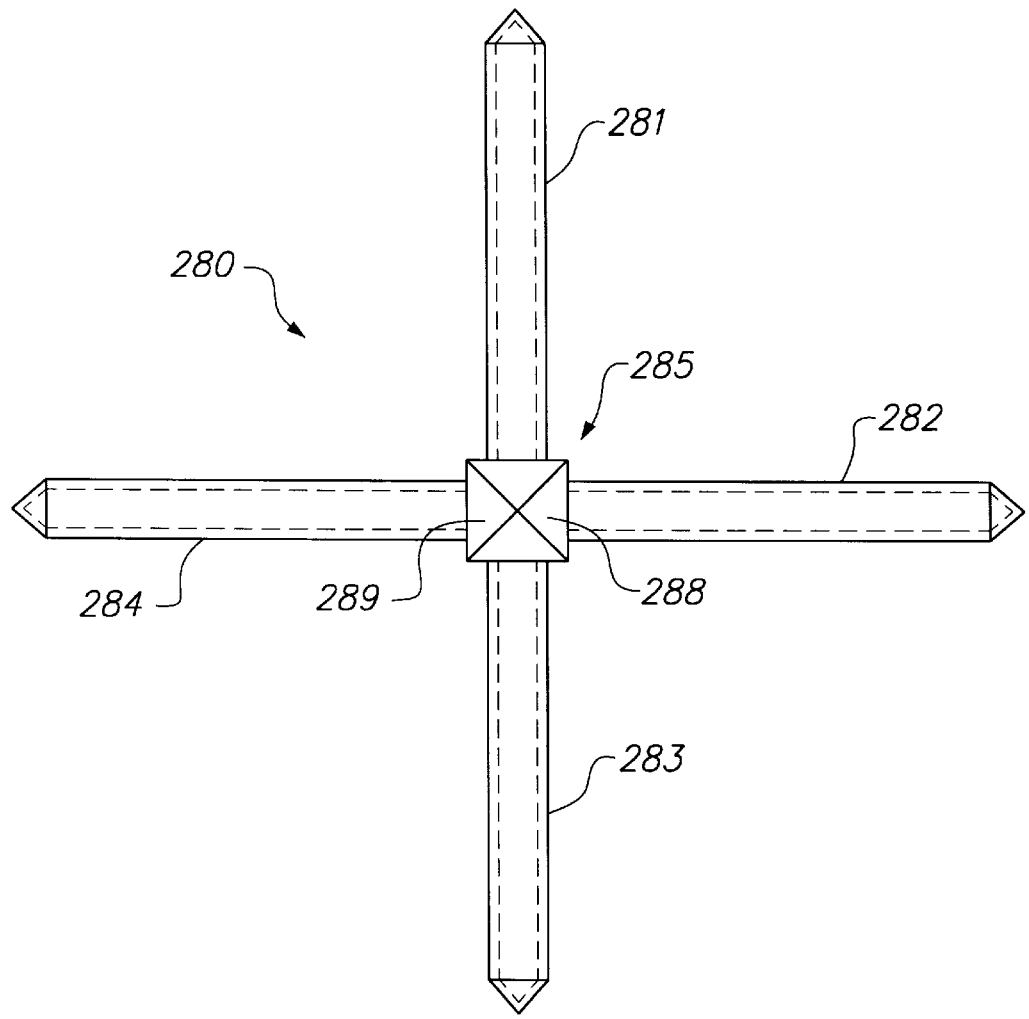
FIG. 19A is a side view of a SLLS prismatic element array.

Shown in FIG. 19A is a top view of an SLLS 280 including a prismatic element array illuminated by a single light source. This light source is not shown in FIG. 19A. The individual prismatic elements are shown at 281, 282, 283 and 284. A reflector assembly with reflective faces is shown generally at 285. This reflector assembly directs the light from a single light source to all of the prismatic element in the array. Two of the reflective surfaces are shown at 288 and 289. Surfaces 288 and 289 utilize the principal of total internal reflection to create their reflective behavior.

Figure 19B:
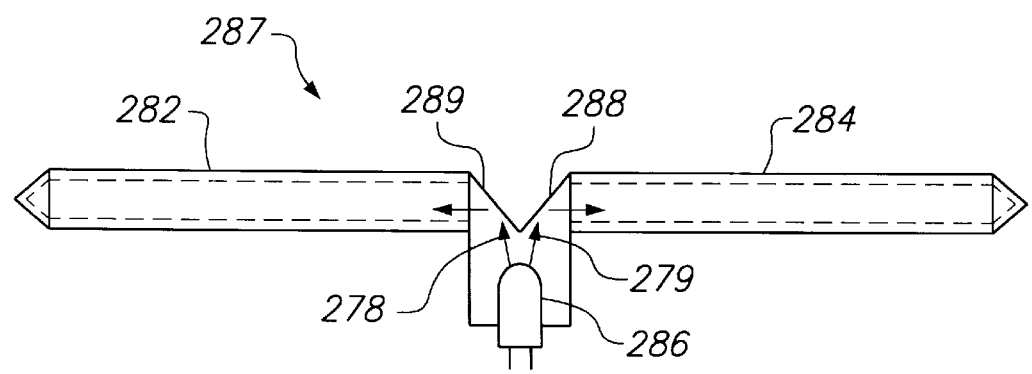
FIG. 19B is a partial cross sectional view of the SLLS prismatic element array shown in FIG. 19A, illustrating a single light source emitting light rays into two of the four prismatic assemblies.

Shown in FIG. 19B is a partial cross section of the SLLS array shown in FIG. 19A. The light source 286 emits light rays 278 and 279 and reflective faces 288 and 289 direct light rays 278 and 279 so that they strike prismatic elements 282 and 284. Light ray 279 reflects off reflective surface 288 into prismatic element 284. Additionally, light ray 278, emitted from light source 286, reflects off surface 289 and is directed into prismatic element 282. As shown in this FIG. the light source itself need not be on the optical centerline of the prismatic element.

Figure 20A:
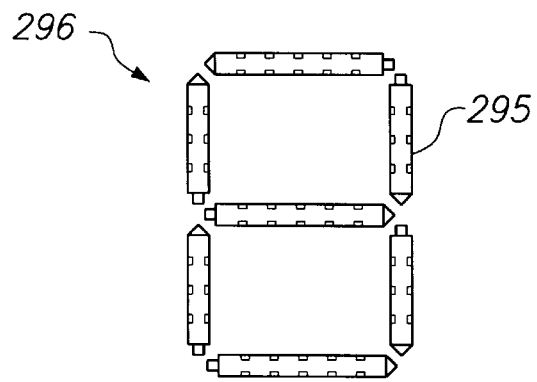
FIG. 20A is a top view of an SLLS prismatic element array forming an alphanumeric display.

A unique characteristic of an SLLS is the ability of the visible light to be viewed with equal intensity from all angles. In other words the appearance of the intense line of light is visible at all positions around the SLLS. This unique property can be exploited in any type of lighted display. One such type of display which can utilize this property is shown in FIG. 20A. FIG. 20A shows an array of SLLS elements arranged as an alphanumeric display. The array is generally shown in FIG. 20A at 290. A typical SLLS used in the construction of the array is shown at 295. A display such as this would not suffer from poor visibility at off axis viewing angles, as is the case with liquid crystal displays and discrete LED displays.

Figure 20B:
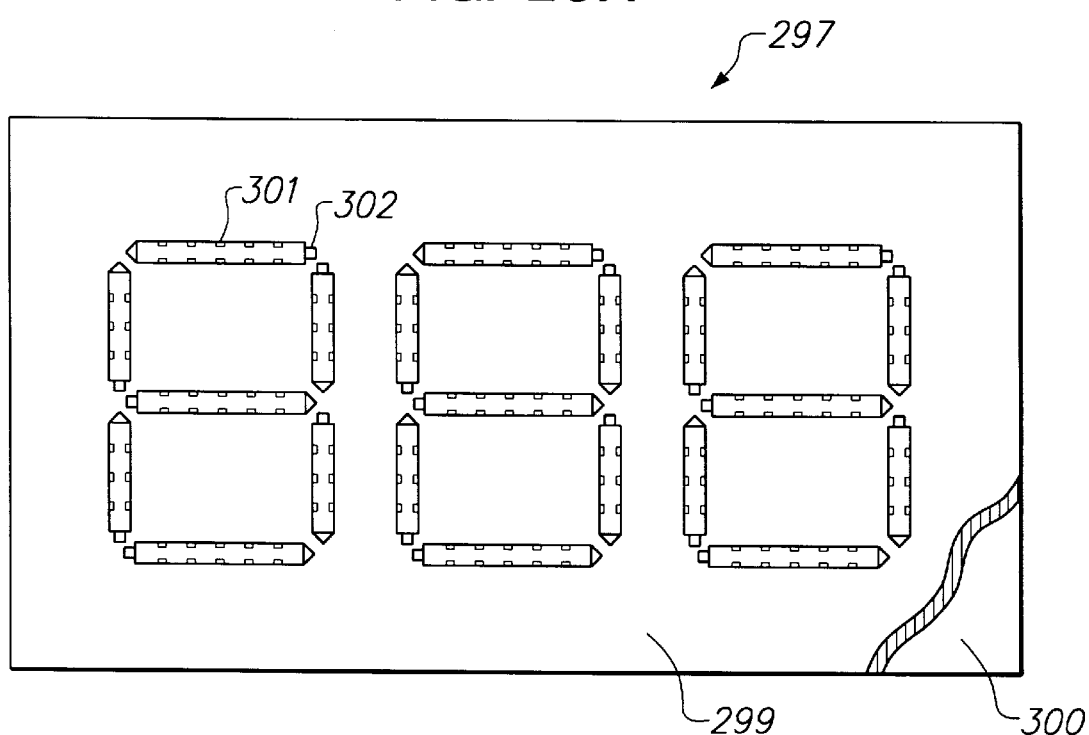
FIG. 20B is a top view of an SLLS prismatic element array which forms an alphanumeric display manufactured from sheets of planar material.

Shown in FIG. 20B is another embodiment of an alphanumeric display 297 composed of several SLLS. This alphanumeric display array is constructed using prismatic elements fabricated in a different manner than that of FIG. 20A. Instead of the individual prismatic elements as shown in FIG. 20A the prismatic element array of FIG. 20B utilizes prismatic elements molded in a planar sheet of material. One of these prismatic elements of top sheet 299 is shown at 301.

An integral light source for prismatic area 301 is shown at 302. The top surface sheet is shown at 299 with the bottom surface sheet shown at 300. Light source 302 may be sandwiched between the two prismatic sheets of material 299 and 300 thus completing the SLLS array. These sheets may be injection or blow molded with the prismatic surfaces integral to the sheet. As can be appreciated, these sheets can be injection molded with the prismatic surfaces on the inside or outside surface but the prismatic surfaces are more easily protected from dirt and abrasion if they are on the inside surface of the sheet. The light sources and associated wiring can be incorporated between the sheets with cavities created therein for the light sources. Top sheet 299 and bottom sheet 300 may be joined together using conventional methods and the alphanumeric display completed. As previously mentioned the viewing angle is very large, almost 180 degrees.

Utilizing a LED for a light source is especially desirable for the invention due to a LED's small size, high luminous efficacy and availability in various emitted colors and spatial light distribution patterns. LEDs may be constructed with an integral SLLS light pipe at time of manufacture. This is accomplished by molding the SLLS prismatic features into the plastic encapsulate used to protect the semiconductor die. LED prior art utilizes lenses, reflectors, and optical fibers to orient light emitted from the semiconductor die. These prior art devices focus light emitted from the semiconductor die in a direction generally perpendicular to the planar surface of the semiconductor die. Examples of the prior art can be seen in U.S. Pat. Nos.: 4,753,520; 5,289,082; 5,742,120; 4,703,219; 5,592,578; and 4,433,898. These prior art devices do not radially distribute the light emitted from the semi conductor die. Instead these devices focus or reflect the light about the central axis of the die in a cone-like pattern.

Individual LEDs may be clustered or oriented in groups in order to act as a sign or display. Examples of this may be seen in U.S. Pat. Nos.: 4,914,731; 3,954,534; 4,467,193; 5,660,461; and 5,119,174. These prior art LED displays use LEDs oriented so that the optical axis of the LED is perpendicular to the surface which is viewed by an observer. In addition, a plurality of LEDs are utilized to illuminate one segment of the display. The invention utilizes LEDs with their optical axis parallel with the viewed surface. Because of the high optical efficiency of the invention a single LED may be used to illuminate an entire segment a sign or alpha numeric display.

Figure 21A:
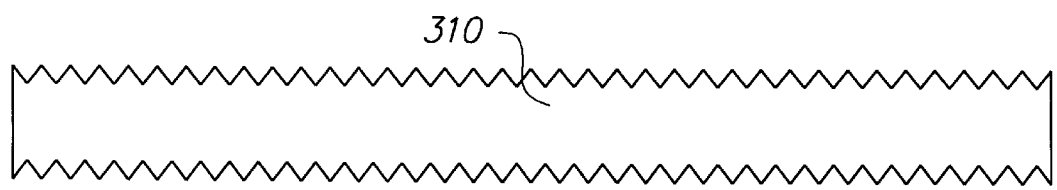

FIG. 21A illustrates a cross section of a prismatic element 310 having prismatic faces located on the outside of the element and is a rod like structure. Shown in FIG. 21B is the prismatic element 310 of FIG. 21A with an optional covering shown at 316. This optional covering has a different index of refraction from that of the underlying prismatic element of FIG. 21A for the purposes maintaining the prismatic characteristics. The index of refraction of 316 need only be different than that of the prismatic element shown in FIG. 21A. It can be of an index of refraction that is greater or less than that used in element 310. In the preferred embodiment the index of refraction or 316 is less than that of prismatic element 310, as this will reduce the number of reflection and refraction events required to finally exit covering 316. As previously mentioned an excess number of reflection and refraction events will cause a decrease in definition of the laser light effect and the light distribution efficiency of the SLLS. The purpose of this optional covering 316 is to protect the prismatic element 310 from dirt, debris and foreign objects. Because of the small nature of the prismatic surfaces, they are easily damaged when they are located on the outside surface of the prismatic element as shown in FIG. 21A. When a prismatic element is covered with optional optical covering, this presents a smooth surface to the outside environment which is easily cleaned and protects the small delicate features of the prismatic element.

FIG. 21C is yet again another embodiment of a prismatic element 325. The prismatic element 325 shown in FIG. 21C contains a tapered inner core shown at 328. Prismatic element 325 is shown with outer prismatic surfaces similar to that shown in FIG. 21A and is covered with an optional covering 316, such as that as shown in FIG. 21B. This particular construction is unique in that a tapered inner core 328 is able to assist in transmitting light down to the far end of the prismatic element, opposite the light source (not shown). This effect is illustrated in FIG. 22.

FIG. 22 shows a cross section of a prismatic element 330 with a tapered inner core 340. The tapered inner core 340 has a different index of refraction than that of the outer prismatic portion 330. The tapered inner core can either have a higher or a lower index of refraction depending on the optical characteristic desired. If the index of refraction of the outer portion 316 is of a lower value than prismatic element 325 then total internal reflection can occur at the various interfaces between the two materials. Total internal reflection is a highly efficient method of transporting light axially along the length of the element until the incident angle is less than the critical angle. As shown in FIG. 22 total internal reflection of light ray 332 is maintained until the emission of light ray 338. If the index of refraction of element 330 is higher than that of the tapered inner core 340 then light rays will be emitted adjacent to the light source 331 as shown with light ray 335.

Also shown in FIG. 22 is light source 331 shown emitting a single light ray 332. Light ray 332 is split into a reflected ray 333 and a refracted ray 334. Refracted ray 334 is emitted as ray 335. Reflected ray 333 continues down the length of the tapered core 340 and with each successive reflection, its angle with respect to the normal of the inner surface of the inner core becomes closer to the normal. With each successive reflection the amount of reflected light versus refracted light decreases. In other words, as light ray 332 reflects down the tapered core of the prismatic element, the incident angle with respect to the normal becomes more normal and a greater portion of this reflective light is transmitted out the sides of the prismatic element. For example, light ray 332 is split into refractive ray 334 and reflective ray 333. Reflected ray 333 continues down the tapered core and at each point a portion of it reflects and a portion of it refracts off the tapered inner core. A typical refracted ray is shown at 337 with corresponding emitted ray 338. As seen in FIG. 22, with each successive reflection, the light rays traveling down the tapered core become closer to the normal of the surface of the tapered prismatic core. The light rays shown in area 341, are essentially perpendicular to the surface of the tapered core and have little if any luminous intensity, due to the majority of the light from the light ray having already been emitted.

Figure 23A:
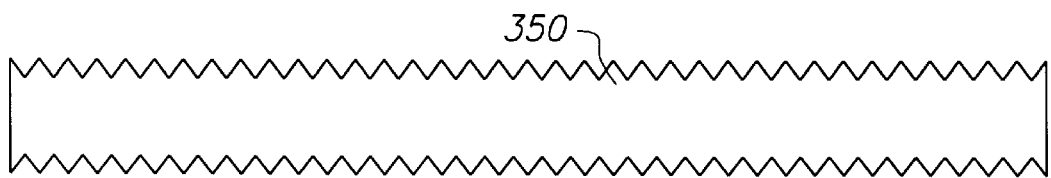
FIGS. 23A and 23B illustrate a manufacturing method which can be utilized to manufacture an SLLS prismatic element.
Figure 23B:
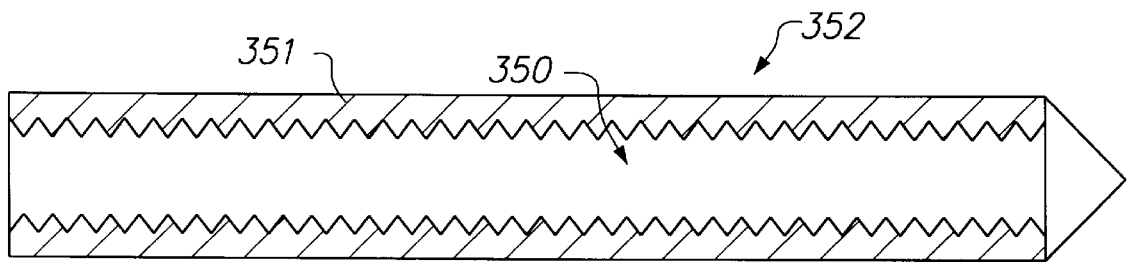

Shown in FIGS. 23A and 23B is a manufacturing method for making a prismatic element with internal prismatic surfaces. A hollow tubular prismatic element is actually a prismatic inner core composed of air surrounded by a outer layer of another material with differing index of refraction. For example, air has an index of refraction of 1.00 and a transparent plastic such as polymethylmethacrylate has an index of refraction of 1.49. Thus, the inner core has an index of refraction which is much less than the index of refraction of the outer layer. A basically equivalent prismatic element may be constructed using an inner core material with an index of refraction which is less than the outer layer as in the previously mentioned air core prismatic element. An example of this would be, an inner core composed of polytetrafluoroethylene with an index of refraction of 1.30 and an outer layer of polyurethane with an index of refraction of 1.66. This type of composite prismatic element is shown in FIG. 23B. A prismatic tubular element can be made by having a inner core material that has an index of refraction that is lower than the surrounding tube. For example, as shown in FIG. 23A is a transparent prismatic core 35 having the angled prismatic surfaces of the desired prismatic element. This core is inserted into an injection molding machine and then additional material 351 is injection molded around the core, resulting in a composite assembly as shown in FIG. 23B. Injection molding core 350 becomes part of the prismatic element assembly. The composite tube assembly is shown generally at 352. As mentioned previously, a hollow prismatic tube acts as a solid prismatic core with an outer covering with a greater index of refraction. The index of refraction of the outer covering 351 can be either greater or lesser than that of the inner core material 350, depending on the included angle of prismatic surfaces and the optical effect desired.

FIGS. 24A and 24B illustrate another manufacturing method for fabricating a prismatic element with internal prismatic surfaces. FIG. 24A is a cross section of a mold 360 with inner prismatic molding surfaces for molding the prismatic elements on an outer surface of the tube 361. Shown at 361 is an extruded tube or rod which enters the mold. The mold has a mold top half 362 and a mold bottom half 363. This mold is heated and the extruded tube 361 or rod made of transparent plastic material is inserted into the mold. When mold halves 362 and 363 are closed on rod or tube 361, prismatic surfaces are created in the rod or tube and this is shown generally at 365. In the case of a tube, the molding process would be blow molding. In the case of a rod, it would be simple compression molding. This can be done on a continuous basis by heating the tube or rod, clamping the mold shut on the tube or rod, opening the mold, and transferring the material out of the mold and continuing.

Shown in FIG. 24B is a convoluted tube shown at 371 manufactured using the process shown in FIG. 24A and covered with optional covering 372. As previously mentioned, with external prismatic surfaces it may be desirable to have a outer covering or jacket covering the prismatic surfaces in order to protect them. Also as previously mentioned, the index refraction of this covering can be greater or lesser than the material of the inner prismatic surfaces. The convoluted tube 371 has air shown at 366 as the material on the inside of the tube. The convoluted tube 371 has internal and external prismatic surfaces.

Figure 25A:
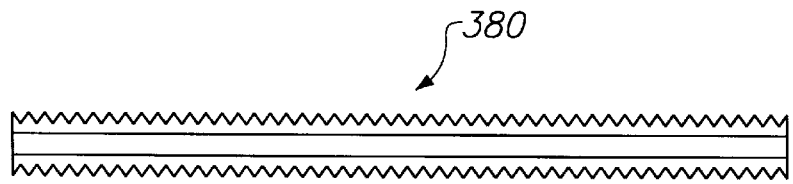
FIGS. 25A, 25B, and 25C illustrate manufacturing steps for manufacturing an elastomeric prismatic element with internal prismatic surfaces.
Figure 25B:
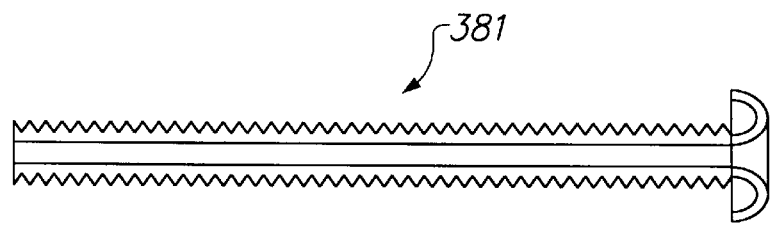
Figure 25C:
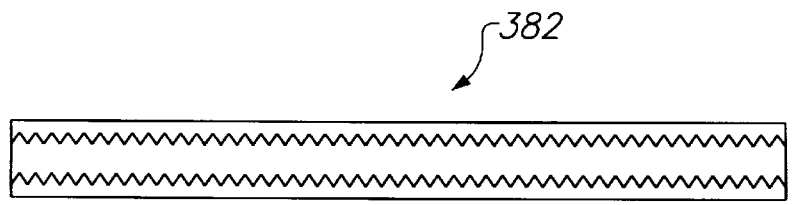

FIGS. 25A, 25B and 25C illustrate a manufacturing method for forming an elastomeric prismatic element. Shown in FIG. 25A is an elastomeric transparent optical element 380 which has been molded inside out. The prismatic surfaces are initially on the outside of the tubular prismatic element 380. FIG. 25B shows this element being to be turned inside out. FIG. 25C shows completion of the inversion of the elastomeric prismatic element 380 to form a tubular prismatic element 382 having prismatic surfaces which were originally manufactured on the outside of the prismatic element and are now inside of the element. Thus, high volume manufacturing methods which are utilized for injection molding prismatic surfaces on the outside of an element, may actually be used to create a prismatic element which has the prismatic surfaces ultimately on the inside.

Figure 26A:
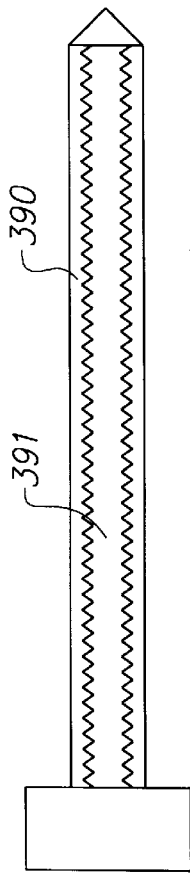
FIGS. 26A, 26B, and 26C illustrate another manufacturing process for creating an elastomeric prismatic element with internal prismatic surfaces.
Figure 26B:
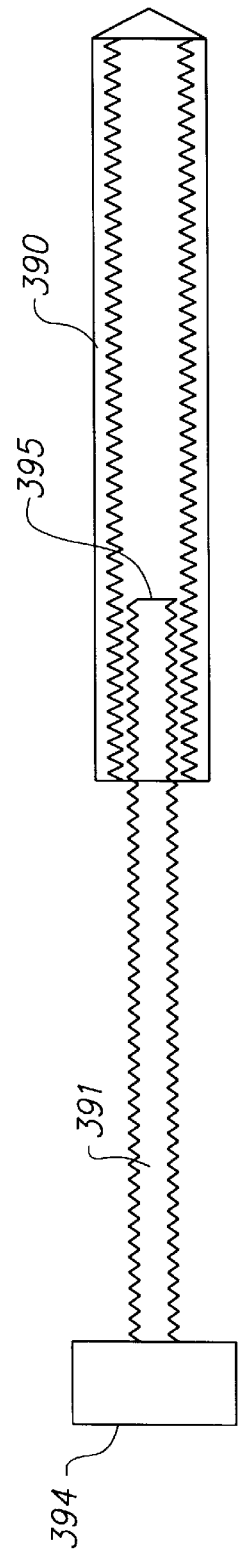
Figure 26C:
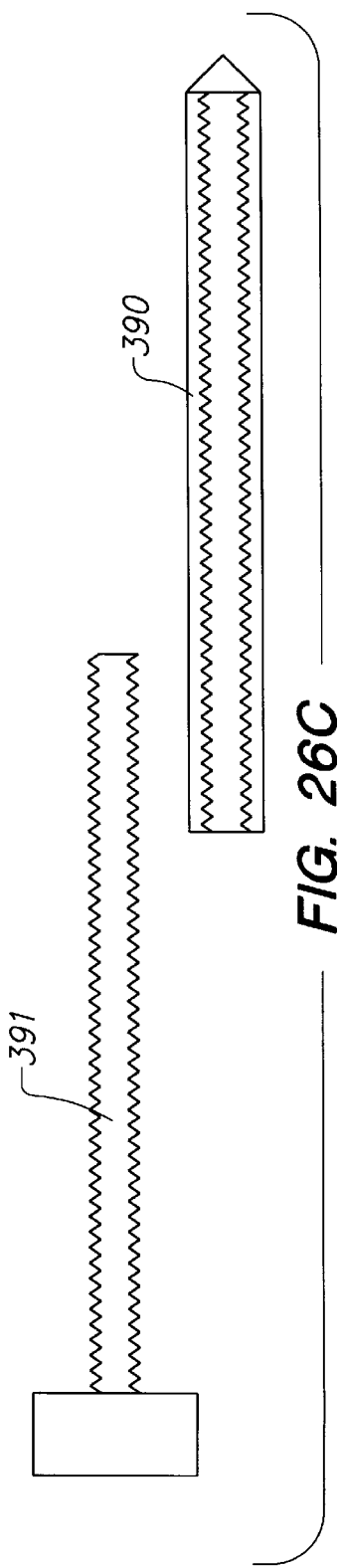

In FIGS. 26A, 26B, and 26C another manufacturing method for an elastomeric prismatic element is shown. FIG. 26A shows an inner core pin 391 and an elastomeric element 390 injection molded around the core pin. In order to remove the elastomeric prismatic element 390 from the core pin air pressure is inserted into the hollow core pin a first end 394. The air is able to exit the core pin at a second end 395. By increasing the air pressure within the core pin 391 the prismatic element 390 is actually inflated, enlarging its inside diameter, thus it is able to be slipped off core pin 391 as shown in FIG. 26C.

Another method for manufacturing a prismatic element with internal prismatic surfaces is shown in FIG. 27A. FIG. 27A shows a partial cross section of a prismatic element which is constructed using injection molding with a tapered core pin. The core pin for injection molding is specially designed using a multistart helical type thread form which defines the prismatic surfaces. By utilizing a multistart helical thread, it is possible to injection mold the prismatic element around this threaded core pin and by unscrewing the core pin a few number of revolutions, remove the core pin. Prismatic surfaces due to their very fine spacing would normally require up to a hundred or more successive revolutions of a core pin to remove it from the prismatic element. By utilizing a multistart tapered helical core pin, it is possible to injection mold a prismatic element on this type of core pin and rotate the core pin, one, two or three turns and remove the core pin entirely. This is only possible by utilizing a multistart thread and the tapered prismatic surface. Despite the fact the actual helix angle of the prismatic surfaces is great, the pitch is very small because of the multistart aspect of the prismatic surface. Using this injection molding method can be very useful when constructing a fairly large prismatic hollow element. These large elements can then be telescoped together into successive sections to make a large prismatic element as shown in FIG. 27B.

FIGS. 28A and 28B illustrate cross sectional views of rod type SLLS 500A and 500B having planar and curved prismatic surfaces. The SLLS 500A and 500B are similar to those shown in FIG. 8. The SLLS 500A and 500B shown in FIGS. 28A and 28B incorporate non-prismatic portions 503 in order to reflect light rays emitted from light source, 501 further down the length of the SLLS. Features 503 act as totally internally reflecting (TIR) reflectors and allow longer length SLLS prismatic elements to be illuminated. These reflective portions 503 will not be intensely illuminated like the prismatic portions 504. Total internal reflection will be achieved in sections 503 if the index of refraction of the prismatic material 509 is greater than the surrounding material 510 and the incident angle at the interface of the two materials is greater than the critical angle. Light ray 506 originating from light source 501 reflects off surface 507 in the non-prismatic section 503, and is emitted as light ray 508. Emitted light ray 505 is unaffected by reflective portions 503.

Figure 29:
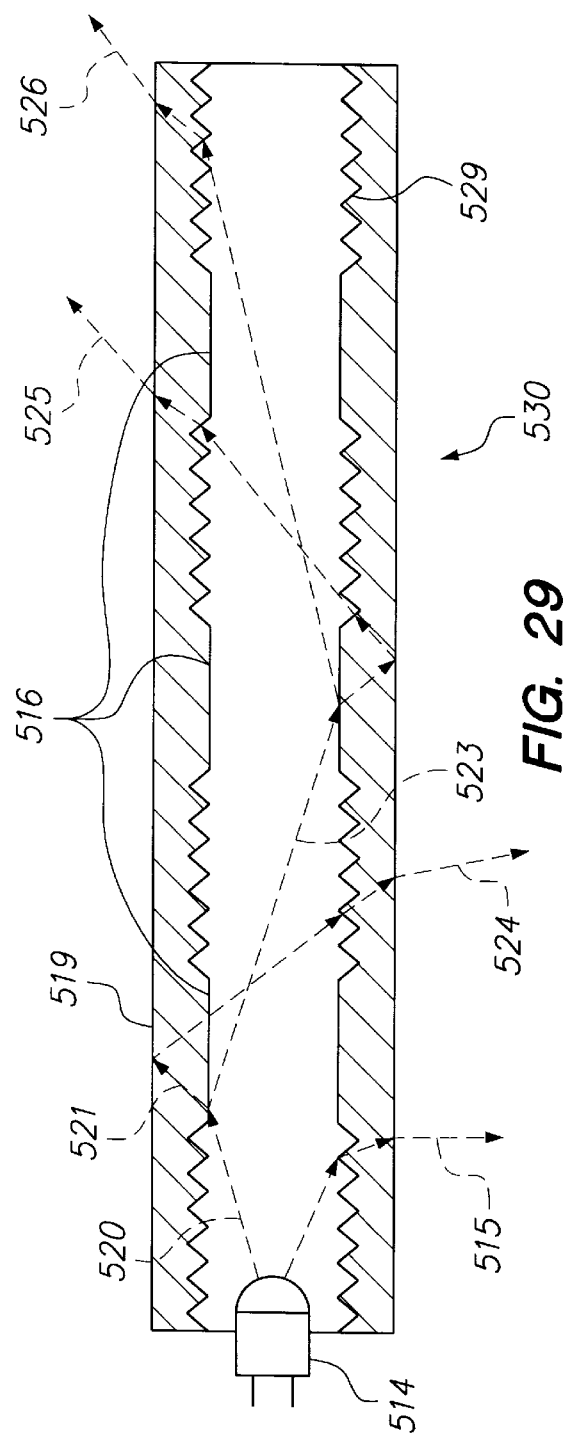
FIG. 29 is a cross sectional side view of a hollow rod SLLS illustrating discontinuous prismatic features separated by optical conduit sections.

FIG. 29 illustrates a cross section of a hollow type SLLS 530 with non-prismatic (reflective) portions 516 similar to those shown in FIG. 28. As shown in FIG. 28, the purpose of the reflective portions 516 is to reflect a portion of the light emitted from light source 514 further down the length of the SLLS 530. Light ray 520 is divided into light rays 521 and 523. Light rays 521 and 523 eventually emerge from the SLLS as light rays 524, 525, and 526. As discussed above total internal reflection may occur at the various optical interfaces. Light ray 521 is shown undergoing total internal reflection at surface 519, and then emerging as light ray 524.

Figure 30:
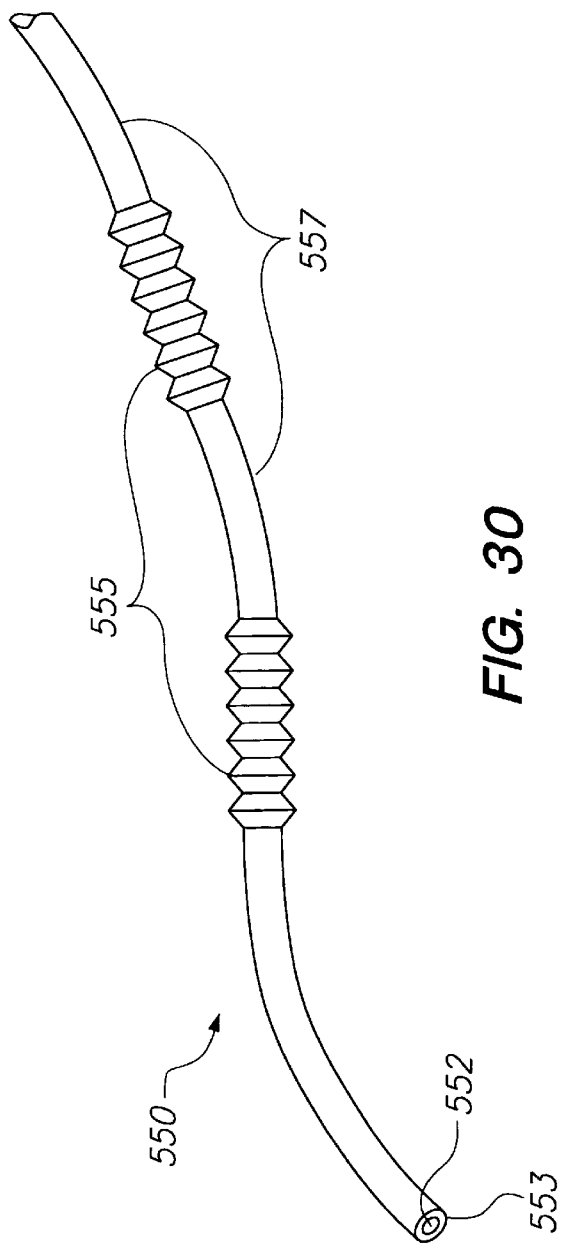
FIG. 30 is a perspective view of a flexible solid rod SLLS with discontinuous prismatic features as in FIG. 28A.

FIG. 30 illustrates a flexible embodiment of the SLLS shown in FIG. 28. Shown in FIG. 30 is a portion of a SLLS manufactured as disclosed above with reference to FIGS. 24A and 24B. As shown in FIG. 30 the SLLS 550 includes prismatic portions 555 and reflective conduit portions 557. FIG. 30 also illustrates the entire surface of portions 555 and 557 to be covered with an optional protective coating 553. If the coating 553 is selected to have an index of refraction to be less than that of the rod material 552 then total internal reflection may be achieved at the reflective section 557. Preferably, the prismatic features 555 are compression molded into the outer surface of the flexible SLLS 550 after the coating 553 is applied. Coating 553 may be co-extruded over flexible rod 552 and then the prismatic features generated in both materials simultaneously.

Figure 31:
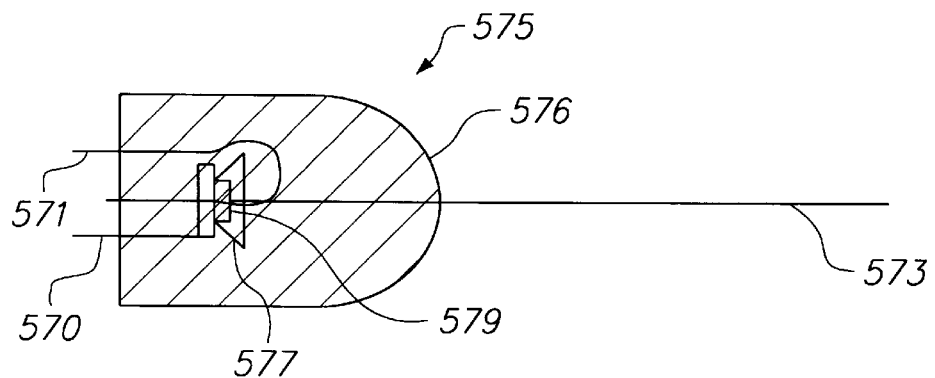
FIG. 31 is a cross-sectional side view of an encapsulated semiconductor light source.

FIG. 31 is a cross sectional side view of a semiconductor light emitting diode encapsulated in an epoxy package. Devices 575 such as that shown in FIG. 31 are commonly known as LEDs. The light emitting semiconductor die or chip as it is also called is located in reflector 577 and is shown at 579. Leads 571 and 570 supply electrical energy to the semiconductor die 579 which emits light which is focused by reflector 577 and lens 576 which is part of the LED protective epoxy enclosure or package. The optical axis of the light which is emitted from the LED is shown at 573.

Figure 32A:
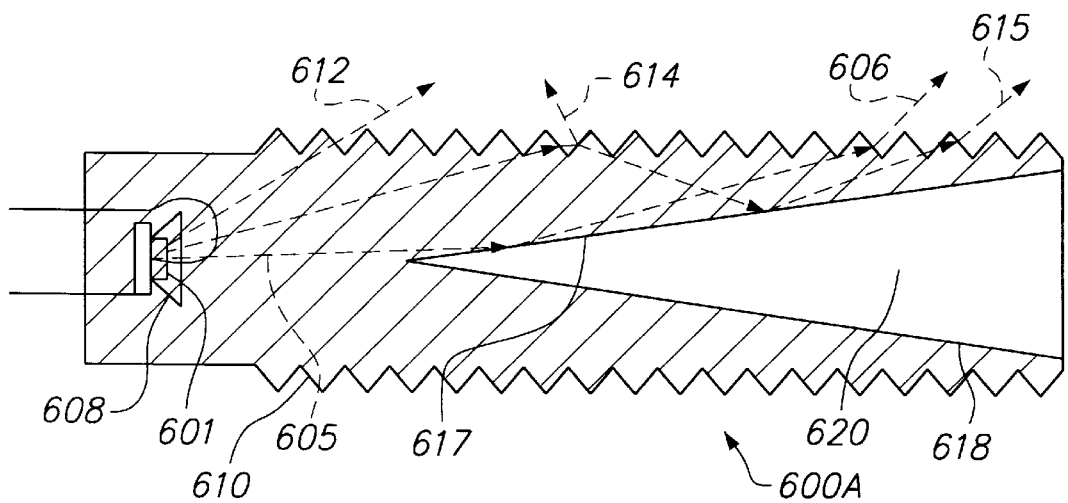
FIGS. 32A and 32B are cross-sectional side views of two encapsulated semiconductor light sources with integral prismatic SLLS light pipes.
Figure 32B:
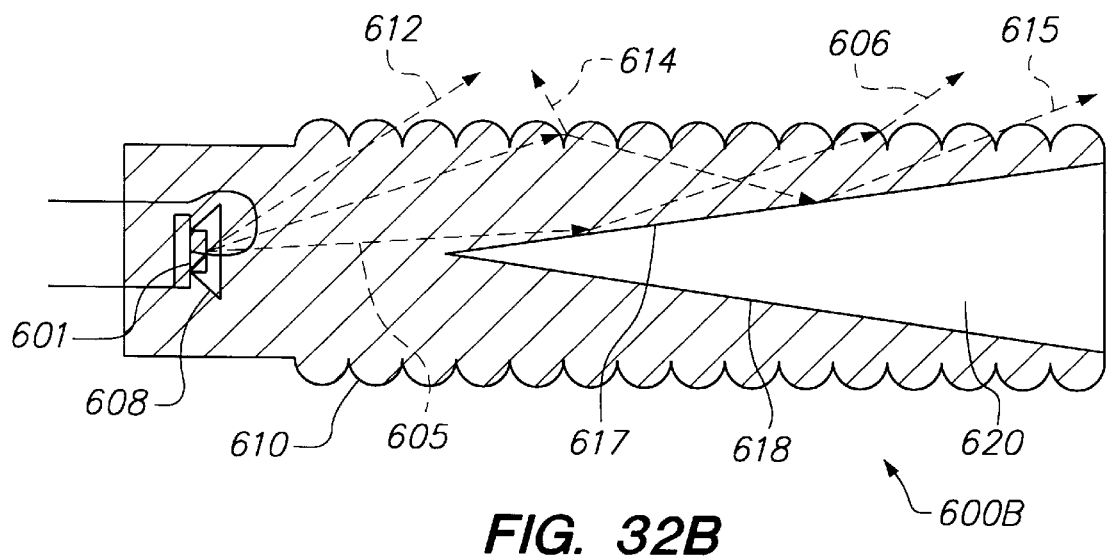

FIGS. 32A and 32B are cross sectional side views of two embodiments of the invention which consists of a SLLS prismatic element 610 which encapsulates the semiconductor die 601, the reflector, 608 and leads. The prismatic surfaces, as shown in FIGS. 32A and 32B, may be planar or curved. As can be seen in FIGS. 32A and 32B, the light rays 611, 605, and 613 are emitted from the die/reflector in a conventional manner but upon striking the outer prismatic surface 610 the light rays are directed radially away from the LED's optical axis. The SLLS prismatic elements shown include an optional conical reflective portion 620 with reflective surfaces 617 and 618. The conical portion 620 should have a lower index of refraction than the element 610 if efficient reflection off the conical surface, shown at 617 and 618, is desired. It is understood that the material used in conical section 620 can be air. If air is utilized in the conical section 620, total internal reflection can occur at the surfaces shown at 617 and 618. Maximum radial distribution of light over a short axial length will be obtained with the conic section acting as a total internal reflecting surface. As shown in FIGS. 32A and 32B, the light ray 605 is totally reflected off the surface 617 and is emitted as emergent light ray 606. Also shown in FIGS. 32A and 32B is a portion of the light ray 613 emitted as the light ray 614 while another portion is reflected of the surface 617 and is emitted as the light ray 615. As previously stated, utilizing a conic section made from a material with a lower index of refraction than prismatic element 610 combined with the proper acute angle will generate a surface which can provide total internal reflection at the surface. Total internal reflection generates near perfect reflection with almost 100% efficiency.

Figure 33:
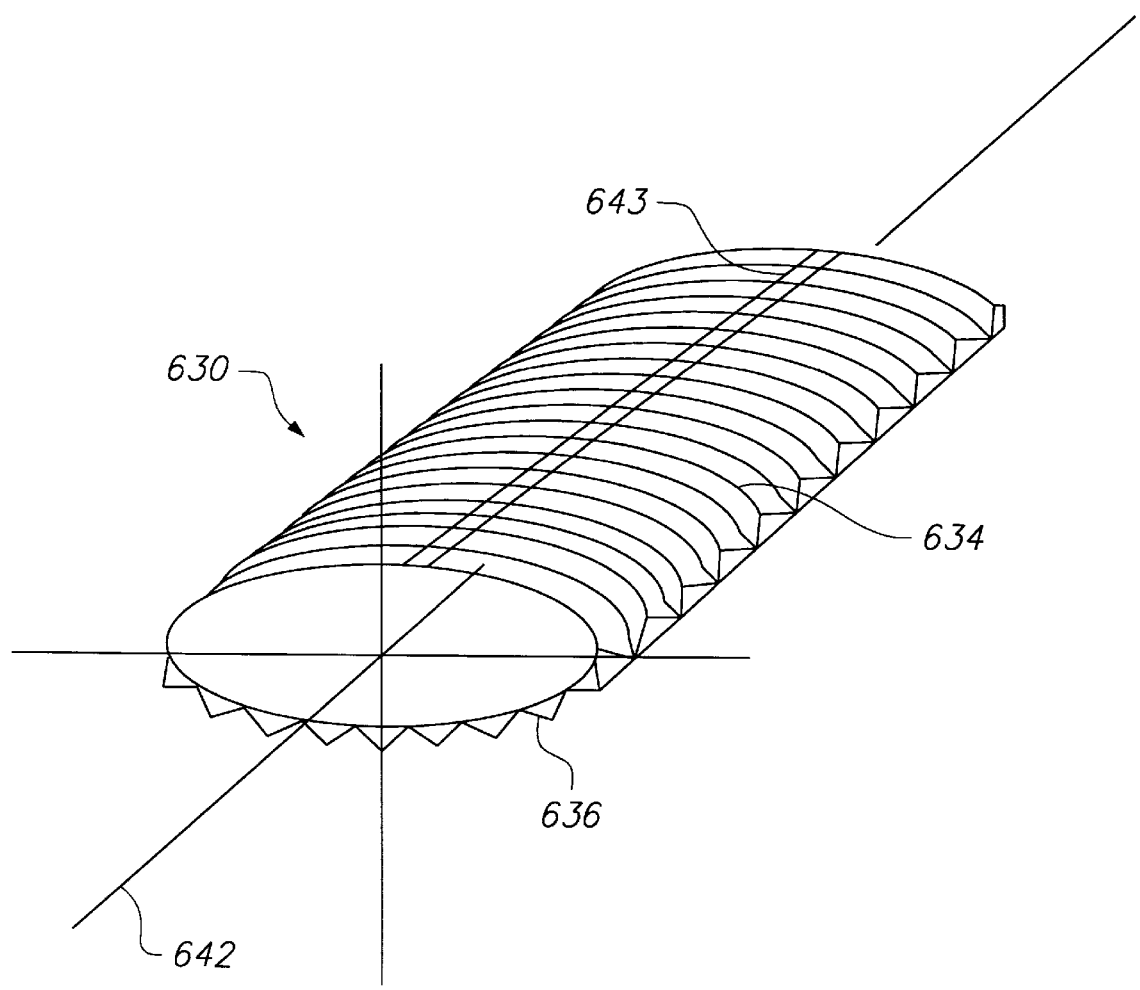
FIG. 33 is a perspective view of an alternate embodiment SLLS prismatic light pipe with non-circular cross-section and prismatic surfaces which are oriented 90 degrees to each other.

FIG. 33 illustrates in perspective view an alternate embodiment of the SLLS prismatic element shown in FIG. 32. A solid rod SLLS prismatic element having a non-circular cross section is shown generally at 630. Element 630 utilizes prismatic features 634 which are perpendicular to the longitudinal axis 642 of the element 630 which is parallel to the light source optical axis (not shown). In addition, prismatic features 636 on an opposite side of the element 630 are oriented parallel to the light source optical axis, thus, perpendicular to the prismatic features 634. The purpose of the prismatic features 636 is to prevent light from being emitted out surface 636 instead reflecting it onto surface 634. This type of construction will result in additional light being emitted from surface 634 in the manner described with respect to the previous embodiments while little or no light is emitted from surface 636. Prismatic surface 636 can be replaced with a smooth non-prismatic surface if desired. As can be appreciated other non-circular cross sections of a SLLS prismatic element are possible. As shown in FIG. 33 the prismatic element is elliptical in cross section. By using an elliptical cross section or other non-circular cross section the apparent diameter of the line of visible light 643 generated by the SLLS can be adjusted. The non-circular cross section of the SLLS prismatic element does reduce the 360 degree viewing capability to a lesser value.

FIGS. 34A through 34E are cross sectional side views of yet another use of a SLLS. FIGS. 34A through 34E utilize a combination of a visible light, light source shown in the figures at 710 and an infrared, non-visable light source shown at 701. Visible light source 710 provides light for the simulated laser light effect while the infrared light source 701 is utilized to interact with an electronic device such as an infrared photo sensor. Infrared light sources also known as infrared emitters are used in television remote controls, video remote controls, and in toys such as laser tag. Since the human eye is not sensitive to infrared light it is difficult to determine where an infrared beam is pointed. By utilizing a SLLS in combination with an infrared light source the direction of the infrared beam can easily be determined by viewing the laser like line of light generated by the SLLS.

Figure 34A:
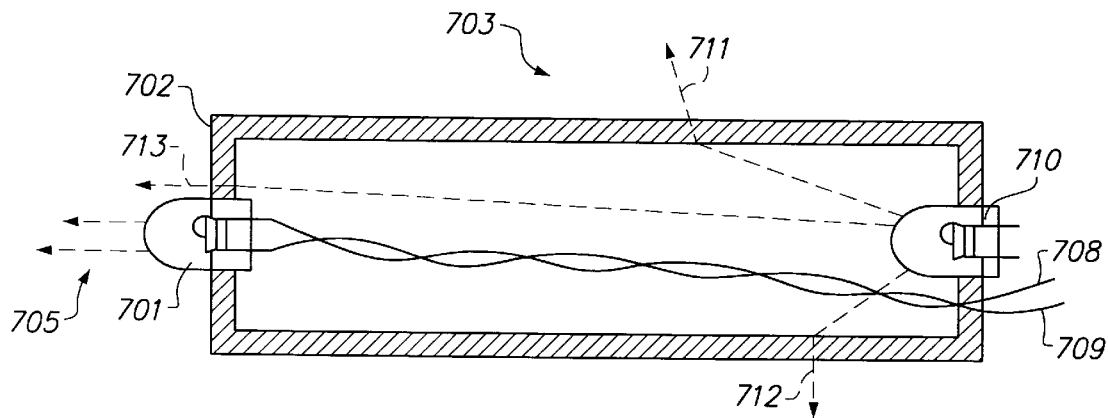
FIGS. 34A, 34B, 34C, 34D and 34E are cross sectional side views of five different embodiments of a SLLS light pipe with both visible light and infrared light sources.
Figure 34B:
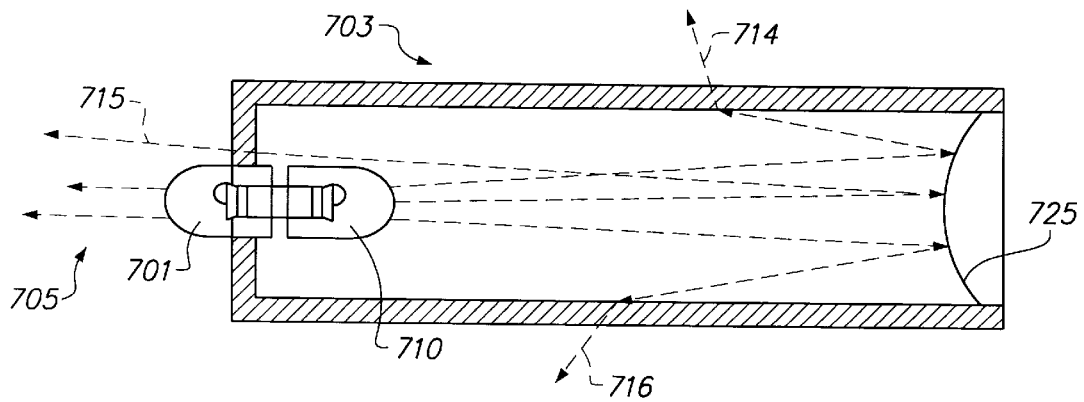
Figure 34C:
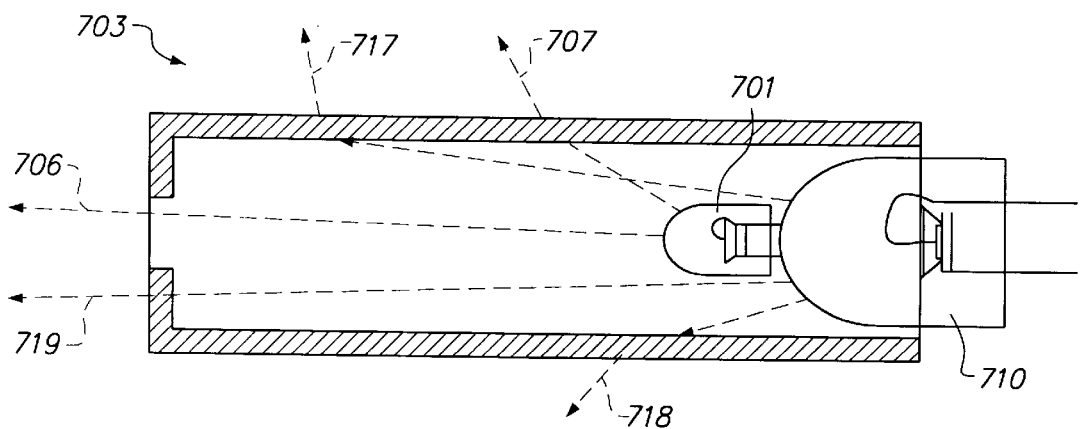
Figure 34D:
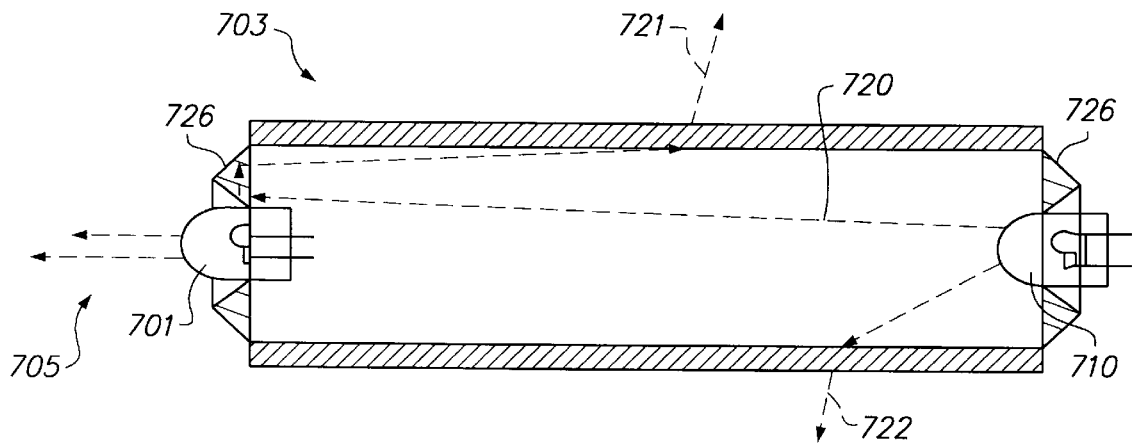

FIGS. 34A, 34B and 34D illustrate SLLS 703 with infrared light source 701 at a first end of the SLLS emitting infrared rays shown at 705.

Figure 34E:
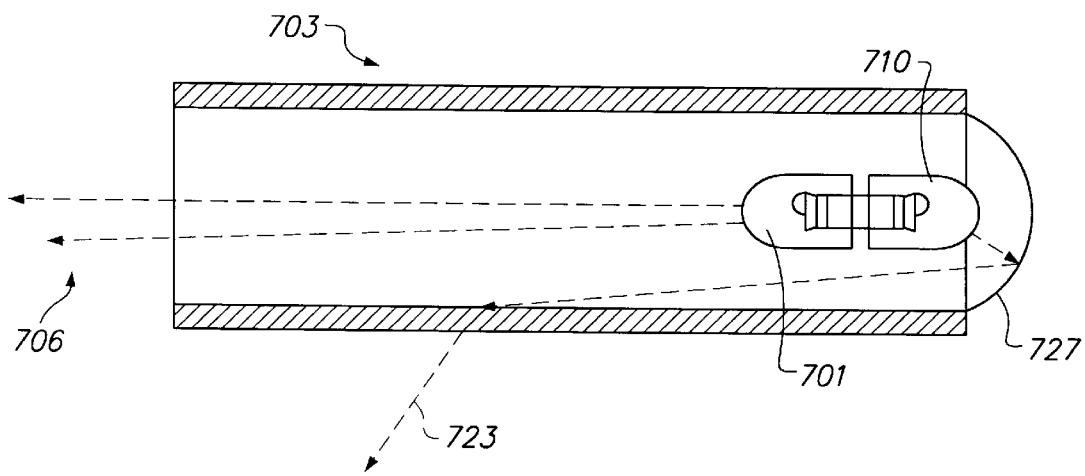

FIGS. 34C and 34E illustrate the infrared light source 701 emitting light ray 706 from a second end of the SLLS through the prismatic element and out the first end of the SLLS.

In FIG. 34A visible emitted light rays are shown at 711 and 712. Visible light ray 713 is emitted through the transparent end cap 702 and assists in determining the direction of the infrared light rays shown at 705. Electrical wires 708 and 709 for light source 701 pass through the hollow prismatic element of the SLLS shown in FIG. 34A. Wires 708 and 709 are not visible from the outside of SLLS 703 due to the reflective characteristics of the prismatic surfaces.

FIG. 34B illustrates another embodiment combining a reflector 725 to reflect the light rays originating from light source 710 resulting in emitted light rays 714, 715 and 716.

FIG. 34C illustrates a SLLS embodiment that provides a laser like line of light generated from light rays such as 717 and 718 but also filters out all non-parallel light rays including infrared light ray emitted as light ray 707. This results in a well defined beam of both infrared and visible light. Visible light ray 719 aids in determining the direction of infrared light rays such as 706.

FIG. 34D illustrates another SLLS embodiment which includes retroflective elements at both ends. Retroflective elements 726 reflect light rays such as 720 in order to allow them to emerge as shown with ray 721. Light rays such as 721 and 722 generate the simulated laser light effect. No visible light rays are emitted from the ends of the SLLS in this embodiment. The retroreflective elements 726 each include an outer conical surface and an inner conical surface inverted within the outer conical surface.

FIG. 34E illustrates the utilization of back to back light sources 701 and 710. Visible light source 710 reflects light off reflector 727 to cause light to be emitted from SLLS 703 such as light ray 723. The reflectors utilized in FIGS. 34B, 34D, and 34E provide compensation for the short length of the SLLS, and the relatively small cone angle of light from the light source. The reflectors in 34B, 34D, and 34E provide additional length for the light source cone of light to diverge inside the SLLS prismatic element.

Figure 37:
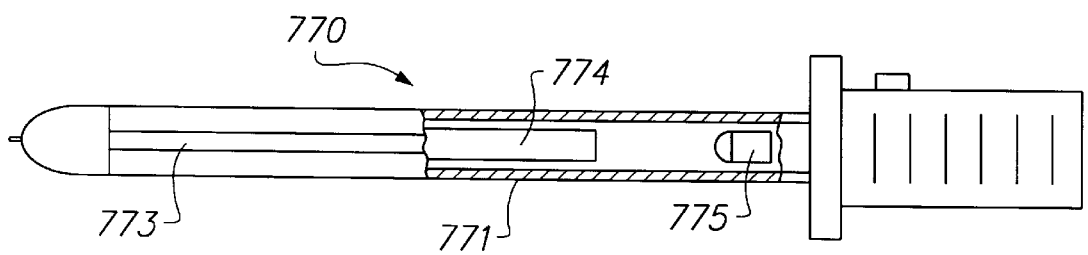
FIG. 37 is a side view of a writing instrument, such as a ball point pen, with an integral hollow SLLS light pipe.

As shown in FIG. 34A a hollow SLLS can accommodate electrical wiring or other objects inside the prismatic structure without severely degrading the optical performance. Since the light emitted from a SLLS emerges from the surface, the optical performance is only slightly compromised with the addition of small internal components. FIG. 34A illustrates electrical wiring for the infrared LED 701 passing through the hollow SLLS prismatic element. As discussed below, FIG. 37 shows an additional object inside a prismatic element. FIG. 37 shows a ball point pen cartridge mounted inside the hollow SLLS prismatic element 771.

Figure 35:
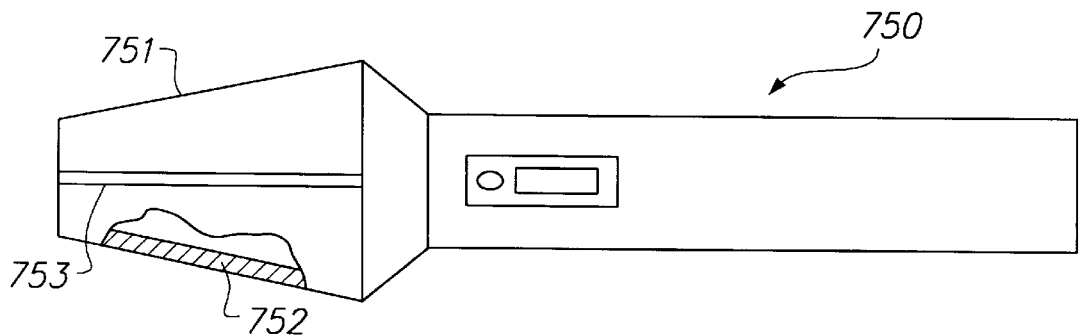
FIG. 35 is a side view of a flashlight with an attached SLLS light pipe.

FIG. 35 is a partial cross section of a flashlight shown at 750 which incorporates a hollow molded prismatic element 751 with internal prismatic features shown at 752. This element is similar to the one shown in FIG. 27A. A line of simulated laser like light is shown at 753.

Figure 36:
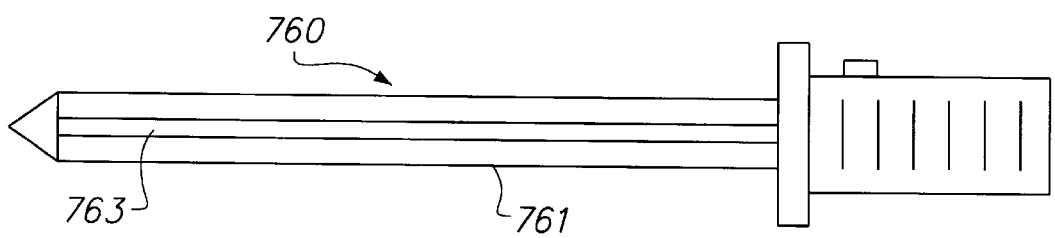
FIG. 36 is a side view of a miniature toy sword with a rod-like SLLS light pipe.

FIG. 36 illustrates at 760, a miniature toy sword with a blade constructed of a rod like SLLS prismatic element 761. The simulated laser light generated by the SLLS is shown at 763.

FIG. 37 is a partial cross section of a ball point pen shown at 770 which utilizes a hollow SLLS prismatic element 771 in conjunction with a light source 775, to generate simulated laser light shown at 773. The ball point pen ink cartridge 774 cannot be seen inside the SLLS prismatic element due to the prismatic surfaces. As previously stated the introduction of small objects inside a SLLS prismatic element only slightly compromises the optical performance and simulated line of laser light.

Figure 38:
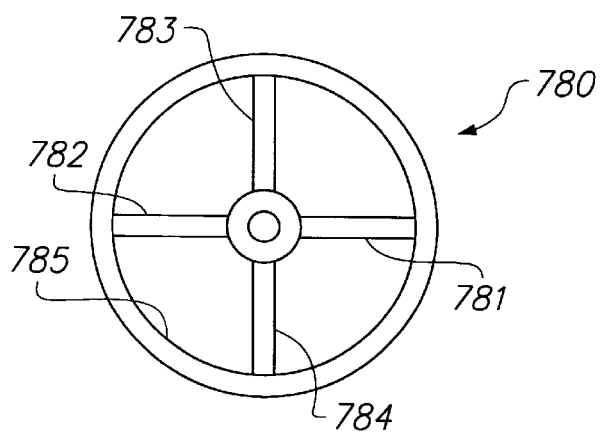
FIG. 38 is a side view of a vehicle wheel such as a bicycle wheel with several SLLS attached.

FIG. 38 illustrates a vehicle wheel shown generally at 780 which incorporates four radial SLLS 781, 782, 783, and 784 and one circumferential SLLS 785.

Figure 39:
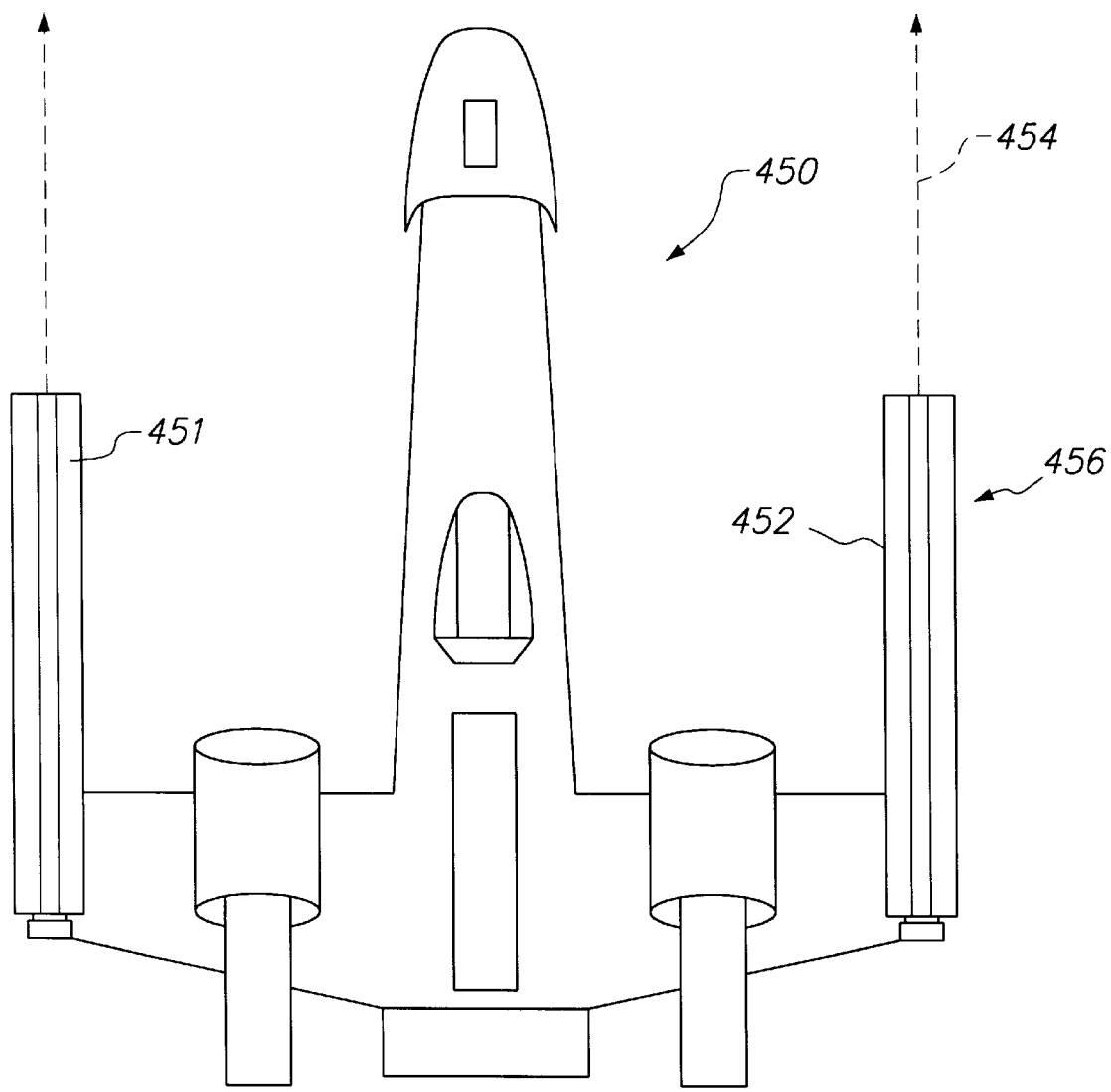
FIG. 39 is a top view of a toy application of a SLLS.

FIG. 39 shows an application for the present invention in which a toy spacecraft 450 utilizes SLLS elements 451 and 452 to simulate laser firing weapons. As shown in FIG. 39, both the radially emitted light 456 and axially emitted light 454 are utilized to enhance the realism and play value of this toy.

The SLLS is designed to provide a radially emitted light that is emitted perpendicular to a tangent to the surface of a prismatic element. Both reflection and refraction is utilized in order to efficiently achieve this orientation of transmitted light. In addition the two opposing prismatic surfaces of the SLLS act in unison with each other to each transmit light in a common plane. Because the prismatic surfaces of the SLLS are positioned opposite each other, around a common longitudinal axis, they are able to simultaneously reflect and refract light in a common plane. By utilizing this feature, the light reflected off the opposite inside surface of the prismatic element can be efficiently transmitted through the opposing surface of the prismatic element. By utilizing the reflected light in this manner the entire surface of the prismatic element may be utilized for light reflection, refraction and transmission. By utilizing all of the available surface area of the prismatic element in this manner a very wide viewing angle can be obtained.

In addition, due the emitted light originating from several different surfaces, the appearance of the line of radially emitted visible light is continuous and without any dark areas where no light is visible. In order to achieve the most laser like appearance of the emitted light, the prismatic surfaces should be very small and located very close together. In other words (referring to FIGS. 4 and 5) the pitch, P should be very small. For ease of manufacture the prismatic surfaces may be manufactured with a helix angle similar to a threaded fastener. In this case the helix angle should be small or otherwise the orientation of the visible light beam will be off axis. This off axis effect can be utilized to increase the width of the visible light beam if a retroreflective end feature or second light source is positioned at the opposite end of the prismatic element. In this case, because the light from the two light sources is in opposite directions to the helically inclined prismatic surfaces, the emitted light due to each light source is offset on opposite sides of the central axis of the prismatic element. These two offset visible beams of light appear as a single wider beam if the helix angle is not too severe.

The typical size of the prismatic surfaces are (again referring to FIGS. 4 and 5);

| Pitch, P | .015 inches, | (.36 mm) |
| Height, H | .010 inches, | (.26 mm) |
| Angle, A | 70 degrees | |

As can be appreciated the small size of the prismatic surfaces makes them very delicate and easily damaged. If a rugged or dirty operating environment is anticipated the prismatic element should be constructed with the prismatic surfaces on the inside rather than the outside surface of the element. The prismatic surfaces may be initially be formed on the outside surface and then subsequently covered with a protective layer of differing index of refraction material with equal results. With a smooth outer surface the prismatic element is more rugged and easily cleaned. Small prismatic elements may be readily injection molded by any the previously mentioned methods. Large prismatic elements lend themselves manufacturing methods which produce thin hollow tubular prismatic elements.

Although the invention has been illustrated as employing triangular or V-shaped prismatic surfaces and U-shaped prismatic surfaces, it should be understood that other prismatic surface shapes may also be used without departing from the invention.

Prismatic surfaces are surfaces which are capable of reflecting, refracting, and transmitting light in a generally radial direction wherein the incident ray, reflected ray, refracted ray, and emitted ray all lie in a common place passing through the central longitudinal axis of the prismatic element. In the special case of total internal reflection no refracted ray may exist for that particular, incident ray only a reflected ray. Depending on the angle of incidence of the light ray the prismatic surface may or may not act as an emitter for a particular light ray. Because of the large variability of the incident angles a SLLS prismatic surface is exposed to due to reflection from the opposite prismatic surface and the back reflections created at the two material interfaces the prismatic surfaces in an SLLS act as reflecting surfaces, refracting surfaces, and emitting surfaces. The shape of the prismatic surface may be either a planar surface, as shown in FIGS. 28A and 32A, or a complex curved surface, as shown in FIGS. 28B and 32B. In order to achieve light transmission efficiency and the SLLS effect the prismatic surfaces must be arranged symmetrically around a common longitudinal axis. As previously stated these surfaces may be planar surfaces or complex curved surfaces. As shown in the prismatic element cross sectional view of FIG. 32A the included angle between the prismatic surfaces may by about 40 to about 100 degrees, preferably on the order of 70 degrees or as shown in the prismatic cross section of FIG. 32B the included angle between the prismatic surfaces may not be definable due to the curved shape of the surfaces.

The invention does not utilize sheets or segments of prismatic films; instead the prismatic features are integral with the light pipe itself. The light pipe is preferably monolithic or formed as a single piece without seams. However, the light pipe may include protective or other coatings. The design of the present invention allows easy manufacture by injection molding, casting, blow molding, thermoforming and other various high volume manufacturing methods.

The well defined, uniform appearance of the apparent laser light effect of the invention is in fact an indicator of its efficient axial and radial distribution of light. If the prismatic features of the invention are not properly fabricated, not only will the line of laser light effect be lost, but the light transmission efficiency will also suffer. The invention relies on specular, non-diffuse reflection and refraction in order to generate the apparent line of laser light and achieve high light distribution efficiency. Manufacturing processes such as molding can achieve the necessary surface finishes required on the prismatic surfaces. Mechanical fabrication methods such as conventional machining cannot achieve the necessary surface finishes required to fabricate an efficient SLLS.

The prior art devices neglect the reflection that occurs when a light ray enters a material with a different index of refraction from that which it was traveling. When light travels from one material to another a portion of that light ray is refracted into the second material and a portion is reflected back into the first material. The portion that is reflected back is dependent on several optical characteristics, such as the angle of incidence and the difference in index of refraction of the two materials. For example, if a light source is located in a material with an index of refraction of 1.3 and enters another material with an index of infraction of 1.0 considerable back reflection can occur. If the light ray is at an incident angle of 30 degrees, 10 percent of the incident light will be reflected back into the first material. If the incident angle is increased to approximately 45 degrees the amount of light reflected back into the first material is almost 50 percent. Prior art devices which utilize prismatic features all experience substantial back reflection, yet none of the prior art address what happens to this internally back reflected light. Incident angles of 45 degrees are common in prismatic structures, thus back reflection effects are common. By orienting the prismatic surfaces symmetrically around a common axis the invention is able to utilize this back reflection to increase the intensity of the emitted light out of the prismatic element. These back reflections provide additional variation in the angles of incident light acting on the prismatic surfaces. This variation in the incident ray angles results in a larger variation of light ray emergent angles, thus increasing the viewing angle of the emitted light. The prismatic surfaces in the invention function as reflective, refractive and transmissive surfaces.

The SLLS of the present invention may be used in many different toy and novelty applications. In addition, the SLLS may be used in light displays, Christmas tree lights, christmas house light, signs, vehicle brake, signal, and dashboard lights, and laser pointers.

Modifications and variations of the present invention will be apparent to those having ordinary skill in the art having read the above teachings, and the present invention is thus limited only by the spirit and scope of the following claims.

I claim:

1. A simulated laser light system comprising:
    a light source which emits substantially parallel light rays; and
    a prismatic element having a plurality of prismatic surfaces and a centerline, said prismatic surfaces defining a curved surface, said prismatic surfaces being on the inside or the outside of the prismatic element, the prismatic surfaces redirecting the light rays to be emitted from the prismatic element in a plurality of planes which are perpendicular to a tangent to said curved surface and extend through the centerline;
    wherein the prismatic element comprises a tube, said prismatic surfaces being located on the inside of said tube and said light rays being axially projected by the light source along the centerline of said tube.

2. A simulated laser light system comprising:
    a light source which emits substantially parallel light rays; and
    a prismatic element having a plurality of prismatic surfaces and a centerline, said prismatic surfaces defining a curved surface, said prismatic surfaces being on the inside or the outside of the prismatic element, the prismatic surfaces redirecting the light rays to be emitted from the prismatic element in a plurality of planes which are perpendicular to a tangent to said curved surface and extend through the centerline;
    wherein the prismatic element comprises a cylindrical rod, the prismatic surfaces being located on the outside of said rod, said light rays being projected by the light source along a centerline of said rod, and the prismatic surfaces are protected by a protective coating around the cylindrical rod.

3. A simulated laser light system comprising:
    a light source which emits substantially parallel light rays; and
    a prismatic element having a plurality of prismatic surfaces and a centerline, said prismatic surfaces defining a curved surface, said prismatic surfaces being on the inside or the outside of the prismatic element, the prismatic surfaces redirecting the light rays to be emitted from the prismatic element in a plurality of planes which are perpendicular to a tangent to said curved surface and extend through the centerline;
    wherein said prismatic element comprises a cylindrical rod and concentrically mounted tube, said rod having prismatic surfaces on the outside of said rod and said tube having prismatic surfaces on the inside of said tube, said prismatic surfaces of said rod and tube being complimentary to each other and in contact with each other.

4. A simulated laser light system comprising:
    a light source which emits substantially parallel light rays; and
    a prismatic element having a plurality of prismatic surfaces and a centerline, said prismatic surfaces defining a curved surface, said prismatic surfaces being on the inside or the outside of the prismatic element, the prismatic surfaces redirecting the light rays to be emitted from the prismatic element in a plurality of planes which are perpendicular to a tangent to said curved surface and extend through the centerline;
    wherein the prismatic element is an elongated element, the light source is positioned at one end of the element, and a second light source is positioned at a second end of the elongated element.

5. A simulated laser light system comprising:
    a light source which emits substantially parallel light rays; and
    a prismatic element having a plurality of prismatic surfaces and a centerline, said prismatic surfaces defining a curved surface, said prismatic surfaces being on the inside or the outside of the prismatic element, the prismatic surfaces redirecting the light rays to be emitted from the prismatic element in a plurality of planes which are perpendicular to a tangent to said curved surface and extend through the centerline;
    wherein a plurality of prismatic elements are arranged in an array as an alphanumeric display.

6. A simulated laser light system comprising:
    a light source which emits substantially parallel light rays; and
    a prismatic element having a plurality of prismatic surfaces and a centerline, said prismatic surfaces defining a curved surface, said prismatic surfaces being on the inside or the outside of the prismatic element, the prismatic surfaces redirecting the light rays to be emitted from the prismatic element in a plurality of planes which are perpendicular to a tangent to said curved surface and extend through the centerline;
    wherein the light emitted from the prismatic element in a plurality of planes appears to an observer to be emitted from the center line of the prismatic element regardless of the observer's location.

7. The simulated laser light system as in claim 6, wherein said light source is a light emitting diode.

8. The simulated laser light system as in claim 6, wherein said light source is a laser diode.

9. The simulated laser light system as in claim 6, wherein said light source is a laser.

10. The simulated laser light system as in claim 6, wherein said light source is an electrical arc light.

11. The simulated laser light system as in claim 6, wherein said light source is an incandescent light.

12. The simulated laser light system as in claim 6, wherein the prismatic element is an elongated tapered member.

13. The simulated laser light system of claim 6, wherein a diameter of the observed light is less than an outside diameter of the prismatic element.

14. The simulated laser light system of claim 6, wherein the prismatic element includes a reflective end feature on at least one end of the prismatic element.

15. The simulated laser light system of claim 14, wherein the reflective end feature is an integrally molded hollow cone.

16. The simulated laser light system of claim 15, wherein the hollow cone reflective end feature is an acute cone.

17. The simulated laser light system of claim 15, wherein the reflective end feature includes an outer conical surface and an inner conical surface inverted within the outer conical surface.

18. The simulated laser light system of claim 14, wherein the prismatic element includes reflective end features at two ends of the prismatic element.

19. The simulated laser light system of claim 6, wherein the light source is a flashlight.

20. The simulated laser light system of claim 6, wherein the light source and molded prismatic element are incorporated in a writing implement.

21. The simulated laser light system of claim 6, wherein the light source and molded prismatic element are positioned on a vehicle wheel.

22. The simulated laser light system as in claim 6, wherein a diameter of the observed light is less than an outside diameter of the prismatic element.

23. A simulated laser light system comprising:
   a light source which emits substantially parallel light rays; and
   a prismatic element having a plurality of prismatic surfaces and a centerline, said prismatic surfaces defining a curved surface, said prismatic surfaces being on the inside or the outside of the prismatic element, the prismatic surfaces redirecting the light rays to be emitted from the prismatic element in a plurality of planes which are perpendicular to a tangent to said curved surface and extend through the centerline;
   wherein the prismatic element acts as a filter to extract non-parallel light rays.

24. A toy comprising:
   a toy body;
   a light source mounted on the toy body; and
   an elongated prismatic element having a plurality of curved prismatic surfaces, the prismatic element redirecting light from the light source in a plurality of planes which intersect at a centerline of the prismatic element causing the light emitted from the prismatic element to appear to an observer to be emitted from approximately the centerline of the prismatic element.

25. An optical light pipe comprising:
   a cylindrical prismatic element having an outer diameter;
   a light source directing light into the cylindrical prismatic element; and
   a plurality of prismatic surfaces on the prismatic element for reflecting and refracting the light emitted by the light source substantially radially from the prismatic element to create an observed beam of radial light with a diameter which is smaller than the outer diameter of the prismatic element when the prismatic element is viewed at any position 360 degrees around the light pipe.

26. The optical light pipe as in claim 25, wherein the diameter of the observed beam is less than one half of the outer diameter of the prismatic element.

27. The optical light pipe as in claim 25, wherein the light source emits light of substantially the same wavelength to give the appearance of a colored laser light beam.

28. The optical light pipe as in claim 25, wherein the prismatic element also emits an axial beam of light which appears to the observer to be substantially parallel to and extend from the observed beam of radial light.

29. An optical element comprising:
   a semiconductor diode;
   a cylindrical prismatic element encapsulating the semiconductor diode, the prismatic element having an outer diameter; and
   a plurality of prismatic surfaces on the prismatic element for reflecting and redirecting light emitted by the semiconductor diode substantially radially from the prismatic element to create an observed beam of light with a diameter which is smaller than the outer diameter of the prismatic element when the prismatic element is viewed from a side.

30. The optical element of claim 29, wherein the outer radius is constant for 360 degrees around the central axis of the prismatic element.

31. The optical element of claim 29, wherein the outer radius is not constant around 360 degrees of the central axis of the prismatic element.

32. The optical element of claim 29, wherein the prismatic element includes reflective end features at opposite ends of the prismatic element.

* * * * *